US 11,265,895 B2

(12) United States Patent
Li et al.

(10) Patent No.: US 11,265,895 B2
(45) Date of Patent: Mar. 1, 2022

(54) METHOD AND APPARATUS FOR IMPROVING CONTROL CHANNEL STRUCTURE IN SHORTENED TRANSMISSION TIME INTERVALS IN A WIRELESS COMMUNICATION SYSTEM

(71) Applicant: ASUSTeK COMPUTER INC., Taipei (TW)

(72) Inventors: Ming-Che Li, Taipei (TW); Ko-Chiang Lin, Taipei (TW); Li-Chih Tseng, Taipei (TW)

(73) Assignee: ASUSTek Computer Inc., Taipei (TW)

(*) Notice: Subject to any disclaimer, the term of this patent is extended or adjusted under 35 U.S.C. 154(b) by 62 days.

(21) Appl. No.: 15/593,992

(22) Filed: May 12, 2017

(65) Prior Publication Data
US 2017/0332397 A1 Nov. 16, 2017

Related U.S. Application Data

(60) Provisional application No. 62/335,415, filed on May 12, 2016.

(51) Int. Cl.
H04W 72/12 (2009.01)
H04L 1/18 (2006.01)
(Continued)

(52) U.S. Cl.
CPC ....... *H04W 72/1268* (2013.01); *H04L 1/1854* (2013.01); *H04L 1/1861* (2013.01);
(Continued)

(58) Field of Classification Search
CPC .................................................. H04W 72/1268
See application file for complete search history.

(56) References Cited

U.S. PATENT DOCUMENTS

2017/0257264 A1* 9/2017 Liu .................. H04W 74/0833

FOREIGN PATENT DOCUMENTS

EP 2343935 A2 7/2011
EP 2393232 A2 12/2011
(Continued)

OTHER PUBLICATIONS

"Beam Forming Impacts," 3GPP TSG-RAN WG2 Meeting #93bis, Apr. 2016, R2-162366, Nokia, Alcatel-Lucent Shanghai Bell, Dubrovnik, Croatia, 3 pages.
(Continued)

*Primary Examiner* — Chi H Pham
*Assistant Examiner* — Raul Rivas
(74) *Attorney, Agent, or Firm* — Cooper Legal Group, LLC

(57) ABSTRACT

Control structures and techniques for transmission time interval (TTI) shortening in wireless communication systems are provided. Exemplary techniques can comprise establishing a UE device connection to a base station having a first TTI, wherein the UE device is configured to employ TTI shortening and has a second TTI different from the first TTI and monitoring a first short physical downlink control channel (PDCCH) region for a scheduled downlink (DL) transmission via the second TTI, wherein a time distribution associated with multiple second TTIs within the first TTI is determined based on a control format indicator (CFI) value indicated via the first TTI. Exemplary techniques can further comprise receiving a DL transmission via the second TTI and transmitting a hybrid automatic repeat request (HARQ) acknowledgement (ACK) (HARQ-ACK) feedback on an associated UL channel for HARQ-ACK feedback, wherein for a number of DL transmissions via the second TTI within one of the first TTI on the associated DL, a number of associated UL channels for HARQ-ACK feedback occur (Continued)

within the same one of the first TTI on the associated UL. Further control structures and techniques for TTI shortening for wireless communication systems are described.

21 Claims, 18 Drawing Sheets

(51) Int. Cl.
H04W 76/10 (2018.01)
H04W 24/08 (2009.01)
H04W 72/04 (2009.01)

(52) U.S. Cl.
CPC ........... *H04L 1/1887* (2013.01); *H04W 24/08* (2013.01); *H04W 72/042* (2013.01); *H04W 72/0446* (2013.01); *H04W 76/10* (2018.02)

(56) References Cited

FOREIGN PATENT DOCUMENTS

| EP | 2552161 | A2 | 1/2013 |
|---|---|---|---|
| JP | 2011517259 | A | 5/2011 |
| WO | 2016015609 | A1 | 2/2016 |
| WO | 2016040290 | A1 | 3/2016 |
| WO | 2016048597 | A1 | 3/2016 |
| WO | 2016053844 | A1 | 4/2016 |
| WO | 2016064048 | A1 | 4/2016 |
| WO | 2016064059 | A1 | 4/2016 |
| WO | 2017130990 | A1 | 8/2017 |

OTHER PUBLICATIONS

"Discussion on terminology of beamforming based high frequency NR," 3GPP TSG-RAN WG2 Meeting #94, May 2016, R2-163716, Samsung, Nanjing, China, 4 pages.
"Beam support in NR," 3GPP TSG RAN WG2 Meeting #93bis, Apr. 2016, R2-162709, Intel Corporation, Dubrovnik, Croatia, 4 pages.
"Active Mode Mobility in NR: SINR drops in higher frequencies," 3GPP TSG-RAN WG2 #93bis, Apr. 2016, R2-162762, Ericsson, Dubrovnik, Croatia, 4 pages.
"Radio Access Architecture and Interfaces," 3rd Generation Partnership Project, Technical Specification Group Radio Access Network, Study on New Radio Access Technology, 3GPP TR 38.801, April 2106, V0.1.0, Release 14, 17 pages.
"Summary of email discussion [93bis#23][NR] Deployment scenarios," 3GPP TSG-RAN WG2 #94, May 2016, R2-164306, Revision of R2-163399, NTT DOCOMO, Inc., Nanjing, China, 18 pages.
"3GPP TDocs (written contributions) at meeting," Meeting: R2-94, May 2016, Nanjing, China, 38 pages. http://www.3gpp.org/DynaReport/TDocExMtg-R2-94-31668.htm.
"RAN2 Impacts in HF-NR," 3GPP TSG-RAN WG2 #94, May 2016, R2-163879, MediaTek Inc., Nanjing, China, 5 pages.
"Beam level management <-> Cell level mobility," 3GPP TSG-RAN WG2 Meeting #93bis, Apr. 2016, R2-162210, Samsung, Dubrovnik, Croatia, 4 pages.
"Cell concept in NR," 3GPP TSG RAN WG2 Meeting #94, May 2016, R2-163471, CATT, Nanjing, China, 4 pages.
"General considerations on LTE-NR tight interworking," 3GPP TSG-RAN WG2 Meeting #94, May 2016, R2-164270, Huawei, HiSilicon, Nanjing, China, 3 pages.
"RAN2 aspects of high frequency New RAT," 3GPP TSG-RAN WG2 Meeting #93bis, Apr. 2016, R2-162251, Samsung, Dubrovnik, Croatia, 8 pages.
"Discussion on Beam Measurement and Tracking for 5G New Radio Interface in mmWave Frequency Bands," 3GPP TSG RAN WG2 #93bis, Apr. 2016, R2-162226, Samsung, Dubrovnik, Croatia, 5 pages.

"Mobility Supporting for HF-NR," 3GPP TSG-RAN WG2 #94, May 2016, R2-163484, MediaTek Inc., Nanjing, China, 6 pages.
"Evolved Universal Terrestrial Radio Access (E-UTRA) and Evolved Universal Terrestrial Radio Access Network (E-UTRAN)," 3rd Generation Partnership Project, Technical Specification Group Radio Access Network, Overall description, 3GPP TS 36.300, Mar. 2016, V13.3.0, 295 pages.
"Radio Resource Control (RRC)—Protocol specification," 3rd Generation Partnership Project, Technical Specification Group Radio Access Network, Evolved Universal Terrestrial Radio Access (E-UTRA), 3GPP TS 36.331, Mar. 2016, V13.1.0, 177 pages.
"User Equipment (UE) procedures in idle mode," 3rd Generation Partnership Project, Technical Specification Group Radio Access Network, Evolved Universal Terrestrial Radio Access (E-UTRA), 3GPP TS 36.304, Mar. 2016, V13.1.0, 43 pages.
Ericsson, "SI: Study on Latency reduction techniques for LTE," 3GPP TSG RAN Meeting #67, Mar. 2015, RP-150465, Shanghai, China, 8 pages.
"Physical Layer Procedures," 3rd Generation Partnership Project, Technical Specification Group Radio Access Network, Evolved Universal Terrestrial Radio Access (E-UTRA), 3GPP TS 36.213, Mar. 2016, V13.1.1, 361 pages.
"Physical Channels and Modulation," 3rd Generation Partnership Project, Technical Specification Group Radio Access Network, Evolved Universal Terrestrial Radio Access (E-UTRA), 3GPP TS 36.211, Mar. 2016, V13.1.0, 155 pages.
"Multiplexing and Channel Coding," 3rd Generation Partnership Project, Technical Specification Group Radio Access Network, Evolved Universal Terrestrial Radio Access (E-UTRA), 3GPP TS 36.212, Mar. 2016, V13.1.0, 129 pages.
"DL Channel Design for Shortened TTI", 3GPP TSG RAN WG1 #84bis, Apr. 2016, R1-163068, Qualcomm Incorporated, Busan, Korea, 7 pages.
European Search Report for European Patent Application No. 17170835.7 dated Nov. 2, 2017, 17 pages.
Huawei et al., "DCI design for short TTI," 3GPP TSG RAN WG1 Meeting #84bis, Apr. 2016, R1-162588, Busan, Korea, 11 pages.
ZTE, "Downlink control channels for shortened TTI," 3GPP TSG RAN WG1 Meeting #84bis, Apr. 2016, R1-162405, Busan, Korea, 7 pages.
Ericsson, "Downlink control signaling design for short TTI," 3GPP TSG RAN WG1 Meeting #84bis, Apr. 2016, R1-163322, Busan, Korea, 4 pages.
Japanese Office Action for Japanese Patent Application No. 2017-095314 dated Jul. 31, 2018, 10 pages (including English translation).
NEC, "Discussion on TTI shortening for DL/UL transmissions," 3GPP TSG-RAN WG1 Meeting #84bis, Apr. 2016, R1-162446, Busan, Korea, 5 pages.
Extended European Search Report for European Application No. 17170835.7 dated Mar. 19, 2018, 16 pages.
Taiwanese Office Action for Taiwanese Application No. 106115878 dated Apr. 18, 2018, 10 pages (including English translation).
Korean Office Action for Korean Application No. 10-2017-0059301 dated Apr. 20, 2018, 14 pages (including English translation).
Extended European Search Report for European Application No. 17208834.6 dated May 8, 2018, 7 pages.
Ericsson, "Time alignment for Dual Connectivity," 3GPP TSG-RAN WG2 #85bis, Mar. 31, 2014-Apr. 4, 2014, Tdoc R2-141162, Valencia, Spain, 4 pages.
Huawei et al: "DCI design for short TTI", 3GPP Draft; R1-162588, 3rd Generation Partnership Project (3GPP), Mobile Competence Centre ; 650, Route Des Lucioles ; F-06921 Sophia-Antipolis Cedex ; France vol. RAN WG1, no. Busan, Korea; Apr. 11-15, 2016 Apr. 2, 2016 (Apr. 2, 2016), XP051080276, Retrieved from the Internet: URL:http://www.3gpp.org/ftp/tsg_ran/WG1_RL1/TSGR1_84b/Docs/.
ZTE: "Downlink control channels for shortened TTI", 3GPP Draft; R1-162405 Downlink Control Channels for Shortened TTI, 3rd Generation Partnership Project (3GPP), Mobile Competence Centre ; 650, Route Des Lucioles ; F-06921 Sophia-Antipolis Cedex; FRAN vol. RAN WG1, no. Busan, Korea; 20160411-

(56) References Cited

OTHER PUBLICATIONS

201604152 Apr. 2016 (Apr. 2, 2016), XP051080178, Retrieved from the Internet: URL:http://www.3gpp.org/ftp/tsg ran/WG1_RL1/TSGR1_84b/Docs/.
Chinese Office Action dated May 8, 2019 for Chinese Application No. 201710335919.X, 9 pages.
Corresponding Indian Patent Application No. 201744016710, Office Action dated Nov. 11, 2020. English Translation.
Corresponding European Patent Application No. 17170835.7, Communication Pursuant to Article 94(3) EPC, dated Nov. 22, 2021.

* cited by examiner

METHOD AND APPARATUS FOR IMPROVING CONTROL CHANNEL STRUCTURE IN SHORTENED TRANSMISSION TIME INTERVALS IN A WIRELESS COMMUNICATION SYSTEM

CROSS-REFERENCE TO RELATED APPLICATIONS

This application claims priority to U.S. Provisional Patent Application Ser. No. 62/335,415, filed on May 12, 2016, and entitled METHOD AND APPARATUS FOR IMPROVING CONTROL CHANNEL STRUCTURE IN SHORTENED TTIs IN A WIRELESS COMMUNICATION SYSTEM, the entirety of which is hereby incorporated by reference.

TECHNICAL FIELD

The subject disclosure is directed to wireless communications, and is more particularly related to control channel structure in shortened transmission time intervals in a wireless communication systems.

BACKGROUND

As maximum data rates of the wireless communication systems increase, packet data latency becomes one of the more important metrics for performance evaluation of wireless communication networks. Thus, reducing packet data latency can improve performance of wireless communication systems and efforts are being made to improve packet data latency for wireless medication systems.

Conventionally, Long Term Evolution (LTE) wireless communication systems employ a transmission time interval (TTI) of about 1 millisecond (ms) or approximately 14 orthogonal frequency division multiplexing (OFDM) symbols. In addition, LTE employs two types of control channels, physical downlink control channel (PDCCH), which is a wide band signal across whole system bandwidth and occupying the first several (e.g., approximately 1-4) OFDM symbols of a typical 1 ms subframe. The region occupied by PDCCH is usually named as control region, and the rest part of the subframe is usually known as data region. A second type of control channel, enhanced physical downlink control channel (ePDCCH), occupies the data region in the time domain, while typically occupying only part of the bandwidth in the frequency domain.

Accordingly, TTI shortening and processing time reduction can be considered for solutions that can facilitate reducing packet data latency, as the time unit for transmission can be reduced e.g., from 1 ms (e.g., approximately 14 OFDM symbols) and the delay caused by decoding can be reduced as well. However, reducing the length of TTI can also have significant impacts on current system design as the physical channels are developed based on 1 ms subframe structure. In addition, reducing the length of TTI can also have significant impacts for scheduling and transmission via physical downlink shared channel (PDSCH) and physical uplink shared channel (PUSCH) with such shortened TTI, due to PDCCH competition and/or short TTI (sTTI) inequality.

The above-described deficiencies of conventional control channel structures and/or transmission time intervals in wireless communication systems are merely intended to provide an overview of some of the problems of conventional systems and methods, and are not intended to be exhaustive. Other problems with conventional systems and corresponding benefits of the various non-limiting embodiments described herein may become further apparent upon review of the various non-limiting embodiments of the following description.

SUMMARY

The following presents a simplified summary of the specification to provide a basic understanding of some aspects of the specification. This summary is not an extensive overview of the specification. It is intended to neither identify key or critical elements of the specification nor delineate any scope particular to any embodiments of the specification, or any scope of the claims. Its sole purpose is to present some concepts of the specification in a simplified form as a prelude to the more detailed description that is presented later.

As used herein, the following terms can be referred to by the respective abbreviations: 3rd Generation Partnership Project (3GPP); acknowledgement (ACK); buffer status report (BSR); Cell Radio Network Temporary Identifier (C-RNTI); channel quality indicator (CQI); control format indicator (CFI); downlink (DL); Enhanced Interference Mitigation and Traffic Adaptation (eIMTA); Evolved Node B (eNB or eNodeB); Evolved Universal Terrestrial Radio Access (E-UTRA); Evolved Universal Terrestrial Radio Access Network (E-UTRAN); Frequency-Division Multiplexing (FDM); Hybrid Automatic Repeat Request (HARQ); Layer 1 (L1); Long Term Evolution (LTE); LTE-Advanced (LTE-A); Medium Access Control (MAC); multiple input, multiple output (MIMO); negative acknowledgement (NACK); New data indicator (NDI); Orthogonal Frequency Division Multiplexing (OFDM); Physical Downlink Control Channel (PDCCH); Physical Uplink Control Channel (PUCCH); Physical Downlink Shared Channel (PDSCH); Physical Uplink Shared Channel (PUSCH); Radio Network Temporary Identifier (RNTI); Relay Node (RN); Radio Resource Control (RRC); Short or Shortened (s-(prefix)), for example, PDCCH for short TTI (sPDCCH); Service Data Unit (SDU); System Frame Number (SFN); Special Cell (SpCell); Semi-Persistent Scheduling (SPS); Scheduling Request (SR); Sounding Reference Signal (SRS); Timing Advance Group (TAG); Time-Division Multiplexing (TDM); Technical Specification (TS); Transmission Time Interval (TTI); User Equipment (UE); Uplink (UL); and Uplink Shared Channel (UL-SCH).

In various non-limiting embodiments, the disclosed subject matter provides TTI shortening, which can facilitate efficient scheduling for sPDSCH and sPUSCH transmissions without sPDCCH competition and scheduling complexity due to sTTI inequality, for example, as further described herein.

For instance, various embodiments are disclosed that can facilitate TTI shortening and wireless medication systems. Accordingly, non-limiting embodiments of the disclosed subject matter can provide example methods that facilitate TTI shortening in UE devices. As non-limiting examples, exemplary methods can comprise establishing with the UE device a connection to a base station having a first TTI, wherein the UE device is configured to employ TTI shortening and has a second TTI different from the first TTI, and monitoring a first short physical downlink control channel (PDCCH) region for a scheduled downlink (DL) transmission via the second TTI, wherein a time distribution associated with multiple second TTIs within the first TTI is determined based in part on a control format indicator (CFI) value indicated via the first TTI.

As a further non-limiting examples, exemplary methods can comprise establishing with the UE device a connection to a base station having a first TTI for an associated DL and an associated uplink (UL), wherein the UE device is configured to employ TTI shortening and has a second TTI different from the first TTI, receiving a DL transmission via the second TTI, and transmitting hybrid automatic repeat request (HARQ) acknowledgement (ACK) (HARQ-ACK) feedback on an associated UL channel for HARQ-ACK feedback, wherein for a number of DL transmissions via the second TTI within one of the first TTI on the associated DL, a number of associated UL channels for HARQ-ACK feedback occur within the same one of the first TTI on the associated UL.

In still further non-limiting examples, exemplary methods can comprise establishing with the UE device a connection to a base station having a first TTI for an associated DL and an associated UL, wherein the UE device is configured to employ TTI shortening and having a third TTI of a number of TTIs different from the first TTI, detecting a second short physical downlink control channel (PDCCH) for scheduling an UL transmission via the third TTI, and transmitting at least a scheduled UL transmission on at least an associated UL channel, wherein for a number of short PDCCHs within one of the first TTI on the associated DL, a plurality of UL channels having the at least the scheduled UL transmission occur within the same one of the first TTI on the associated UL.

In addition, further example implementations are directed to systems, devices and/or other articles of manufacture that facilitate TTI shortening, as further detailed herein.

These and other features of the disclosed subject matter are described in more detail below.

BRIEF DESCRIPTION OF THE DRAWINGS

The devices, components, systems, and methods of the disclosed subject matter are further described with reference to the accompanying drawings in which.

DETAILED DESCRIPTION

Figure 1:
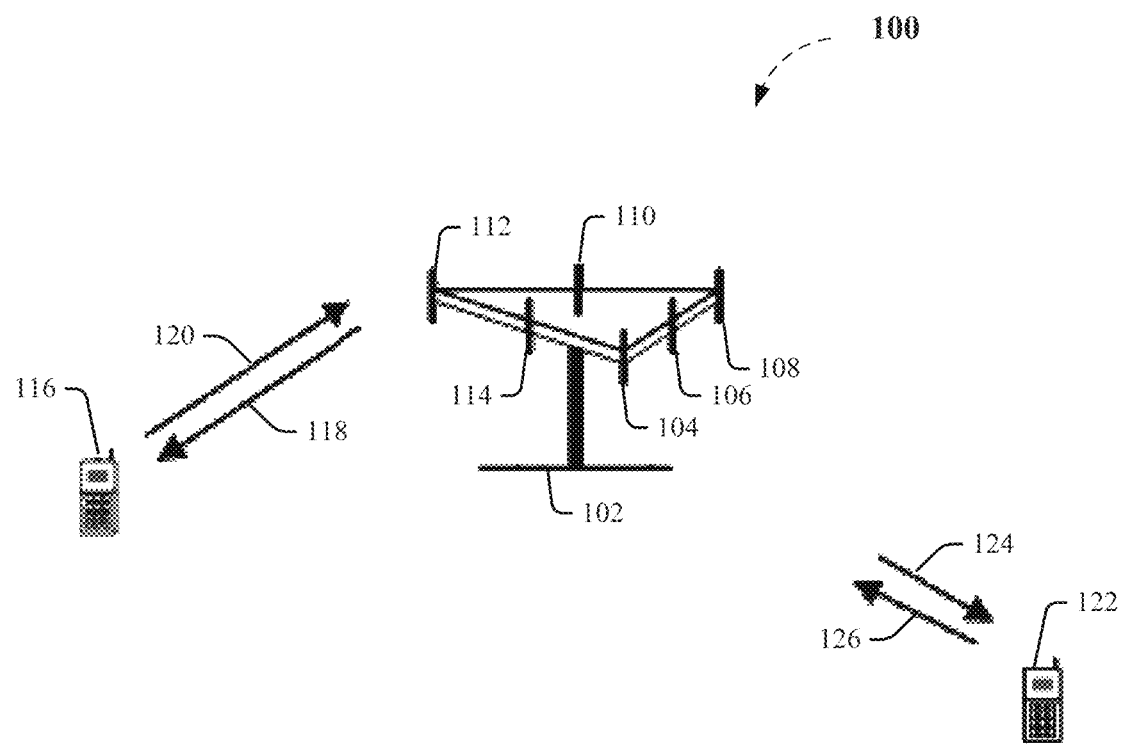
FIG. 1 is a block diagram representing an exemplary non-limiting multiple access wireless communication system in which various embodiments directed to shortened or short TTIs (sTTIs) described herein can be implemented.

As described above, deficiencies of conventional control channel structures and/or transmission time intervals in wireless communication systems can provide opportunities to reduce packet data latency, which can improve performance of wireless communication systems.

For example, Long Term Evolution (LTE) wireless communication systems employ a transmission time interval (TTI) of about 1 millisecond (ms) or approximately 14 orthogonal frequency division multiplexing (OFDM) symbols. In addition, LTE employs two types of control channels, physical downlink control channel (PDCCH), which is a wide band signal across whole system bandwidth and occupying the first several (e.g., approximately 1-4) OFDM symbols of a typical 1 ms subframe. The region occupied by PDCCH is usually named as control region, and the rest part of the subframe is usually known as data region. A second type of control channel, enhanced physical downlink control channel (ePDCCH), occupies the data region in the time domain, while typically occupying only part of the bandwidth in the frequency domain.

Accordingly, TTI shortening and processing time reduction can be considered for solutions that can facilitate reducing packet data latency, as the time unit for transmission can be reduced e.g., from 1 ms (e.g., approximately 14 OFDM symbols) and the delay caused by decoding can be reduced as well. However, while efforts are being made to improve packet data latency for wireless medication systems, reducing the length of TTI can have significant impacts on current system design as the physical channels are developed based on 1 ms subframe structure, as described above. In addition, reducing the length of TTI can also have significant impacts for scheduling and transmission via physical downlink shared channel (PDSCH) and physical uplink shared channel (PUSCH) with such shortened TTI, due to PDCCH competition and/or short TTI (sTTI) inequality.

Accordingly, non-limiting embodiments as described herein can provide control channel structures and/or techniques that facilitate reduction of transmission time intervals in wireless communication systems, which can provide opportunities to reduce packet data latency, which can improve performance of wireless communication systems, while avoiding and/or mitigating significant impacts for scheduling and transmission via PDSCH and PUSCH with such shortened TTI, due to PDCCH competition and/or sTTI inequality.

As non-limiting examples, exemplary control structures and techniques for TTI shortening are provided. Exemplary techniques can comprise establishing a UE device connection to a base station having a first TTI, wherein the UE device is configured to employ TTI shortening and has a second TTI different from the first TTI and monitoring a first short physical downlink control channel (PDCCH) region for a scheduled downlink (DL) transmission via the second TTI, wherein a time distribution associated with multiple second TTIs within the first TTI is determined based on a control format indicator (CFI) value indicated via the first TTI. Exemplary techniques can further comprise receiving a DL transmission via the second TTI and transmitting a hybrid automatic repeat request (HARQ) acknowledgement (ACK) (HARQ-ACK) feedback on a channel of an associated UL for HARQ-ACK feedback, wherein for the number of DL transmissions via the second TTI within one of the first TTI on the associated DL, the number of channels of the associated UL for HARQ-ACK feedback occur within the same one of the first TTI on the associated UL. Further non-limiting control structures and techniques for TTI shortening are described.

While a brief overview has been described above in order to provide a basic understanding of some aspects of the specification, various non-limiting devices, systems, and methods are now described as a further aid in understanding the advantages and benefits of various embodiments of the disclosed subject matter. To that end, it can be understood that such descriptions are provided merely for illustration and not limitation.

Various embodiments of the subject disclosure described herein can be applied to or implemented in exemplary wireless communication systems and devices described below. In addition, various embodiments of the subject disclosure are described mainly in the context of the 3GPP architecture reference model. However, it is understood that with the disclosed information, one skilled in the art could easily adapt for use and implement aspects of the subject disclosure in a 3GPP2 network architecture as well as in other network architectures, as further described herein.

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WiMax, 3GPP NR (New Radio) wireless access for 5G, or some other modulation techniques.

FIG. 1 is a block diagram representing an exemplary non-limiting multiple access wireless communication system 100 in which various embodiments described herein can be implemented. An access network 102 (AN) includes multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 118 and receive information from access terminal 116 over reverse link 120. Access terminal (AT) 122 is in communication with antennas 106 and 108, where antennas 106 and 108 transmit information to access terminal (AT) 122 over forward link 124 and receive information from access terminal (AT) 122 over reverse link 126. In a Frequency Division Duplex (FDD) system, communication links 118, 120, 124 and 126 may use different frequency for communication. For example, forward link 118 may use a different frequency than that used by reverse link 120.

Each group of antennas and/or the area in which they are designed to communicate is often referred to as a sector of the access network. In non-limiting aspects, antenna groups each can be designed to communicate to access terminals in a sector of the areas covered by access network 102.

In communication over forward links 118 and 124, the transmitting antennas of access network 102 may utilize beamforming in order to improve the signal-to-noise ratio of forward links for the different access terminals 116 and 122. Also, an access network using beamforming to transmit to access terminals scattered randomly through its coverage normally causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), a communication device, a wireless communication device, a mobile device, a mobile communication device, a terminal, an access terminal or some other terminology.

Figure 2:
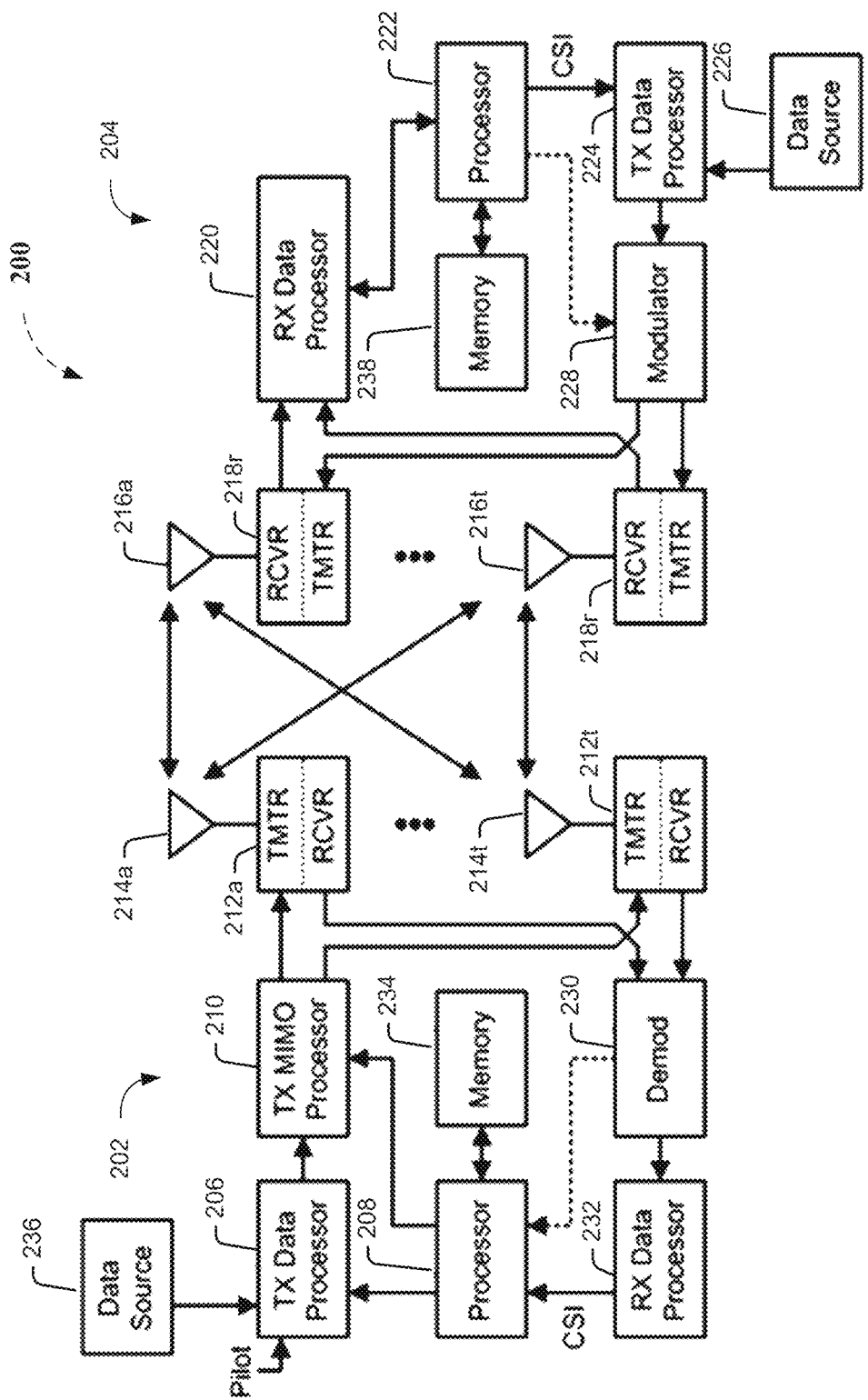
FIG. 2 is a simplified block diagram of an exemplary non-limiting MIMO system depicting an exemplary embodiment of a transmitter system (also referred to herein as an access network) and a receiver system (also referred to herein as an access terminal (AT) or user equipment (UE)), suitable for incorporation of various aspects directed to sTTIs described herein.

FIG. 2 is a simplified block diagram of an exemplary non-limiting MIMO system 200 depicting an exemplary embodiment of a transmitter system 202 (also referred to herein as the access network) and a receiver system 204 (also referred to herein as an access terminal (AT) or user equipment (UE)), suitable for incorporation of various aspects directed to sTTIs described herein.

In a non-limiting aspect, each data stream can be transmitted over a respective transmit antenna. Exemplary TX data processor 206 can format, code, and interleave the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system 204 to estimate the channel response. The multiplexed pilot and coded data for each data stream is then modulated (e.g., symbol mapped) based on a particular modulation scheme (e.g., binary phase-shift keying (BPSK), quadrature phase shift keying (QPSK), M-ary or higher-order PSK (M-PSK), or M-ary quadrature amplitude modulation (M-QAM), etc.) selected for that data stream to provide modulation symbols. The data rate, coding, and modulation for each data stream may be determined by instructions performed by processor 208.

The modulation symbols for all data streams are then provided to a TX MIMO processor 210, which may further process the modulation symbols (e.g., for OFDM). TX MIMO processor 210 then provides multiple (NT) modulation symbol streams to NT transmitters (TMTR) 212a through 212t. In certain embodiments, TX MIMO processor 210 applies beamforming weights to the symbols of the data streams and to the antenna from which the symbol is being transmitted.

Each transmitter 212 receives and processes a respective symbol stream to provide one or more analog signals, and further conditions (e.g., amplifies, filters, and upconverts, etc.) the analog signals to provide a modulated signal suitable for transmission over the MIMO channel. NT modulated signals from transmitters 212a through 212t are then transmitted from NT antennas 214a through 214t, respectively.

At receiver system 204, the transmitted modulated signals are received by multiple (NR) antennas 216a through 216r and the received signal from each antenna 216 is provided to a respective receiver (RCVR) 218a through 218r. Each receiver 218 conditions (e.g., filters, amplifies, and downconverts, etc.) a respective received signal, digitizes the conditioned signal to provide samples, and further processes the samples to provide a corresponding "received" symbol stream.

A RX data processor 220 then receives and processes the NR received symbol streams from NR receivers 218 based on a particular receiver processing technique to provide NT "detected" symbol streams. The RX data processor 220 then demodulates, deinterleaves, and decodes each detected symbol stream to recover the traffic data for the data stream. The processing by RX data processor 220 is complementary to that performed by TX MIMO processor 210 and TX data processor 206 at transmitter system 202.

A processor 222 periodically determines which pre-coding matrix to use, for example, as further described herein. Processor 222 formulates a reverse link message comprising a matrix index portion and a rank value portion.

The reverse link message may comprise various types of information regarding the communication link and/or the received data stream. The reverse link message is then processed by a TX data processor 224, which also receives traffic data for a number of data streams from a data source 226, modulated by a modulator 228, conditioned by transmitters 218a through 218r, and transmitted back to transmitter system 202.

At transmitter system 202, the modulated signals from receiver system 204 are received by antennas 214, conditioned by receivers 212, demodulated by a demodulator 230, and processed by a RX data processor 232 to extract the reserve link message transmitted by the receiver system 204. Processor 208 then determines which pre-coding matrix to use for determining the beamforming weights then processes the extracted message.

Memory 234 may be used to temporarily store some buffered/computational data from 230 or 232 through Processor 208, store some buffed data from data source 236, or store some specific program codes, for example, as further described herein, for example, regarding FIGS. 15-18. Likewise, memory 238 may be used to temporarily store some buffered/computational data from RX data processor 220 through processor 222, store some buffed data from data source 226, or store some specific program codes, for example, as further described herein, for example, regarding FIGS. 15-18.

As described above, deficiencies of conventional control channel structures and/or transmission time intervals in wireless communication systems can provide opportunities to reduce packet data latency, which can improve performance of wireless communication systems. As such, investigations to reduce latency in LTE networks have been undertaken to study enhancements to the E-UTRAN radio system in order to significantly reduce the packet data latency over the LTE Uu air interface for an active UE and significantly reduce the packet data transport round trip latency for UEs that have been inactive for a longer period (in connected state), and for both FDD) and TDD modes, for example, in 3GPP RP-150465, "New SI proposal: Study on Latency reduction techniques for LTE", Ericsson, Huawei, the entirety of which is incorporated herein by reference.

Among other things, the study is assessing specification impact, feasibility, and performance of TTI lengths between 0.5 ms and one OFDM symbol, taking into account impact on reference signals and physical layer control signaling. As described above, TTI shortening and processing time reduction can be considered for solutions that can facilitate reducing packet data latency, as the time unit for transmission can be reduced e.g., from 1 ms (e.g., approximately 14 OFDM symbols) and the delay caused by decoding can be reduced as well. As further described herein, reducing the length of TTI can also have significant impacts on current system design as the physical channels are developed based on 1 ms subframe structure. Thus, non-limiting embodiments as described herein can provide control channel structures and/or techniques that facilitate reduction of transmission time intervals in wireless communication systems, which can provide opportunities to reduce packet data latency, which can improve performance of wireless communication systems, while avoiding and/or mitigating significant impacts for scheduling and transmission via PDSCH and PUSCH with such shortened TTI, due to PDCCH competition and/or sTTI inequality.

As further described above, for control channels, the region occupied by PDCCH is usually named as control region, and the rest part of the subframe is usually known as data region, whereas ePDCCH, occupies the data region in the time domain, while typically occupying only part of the bandwidth in the frequency domain, for example, as further described in 3GPP TS 36.213 v13.1.1, "E-UTRA Physical layer procedures (Release 13)", and 3GPP TR 36.211 V13.1.0, "E-UTRA Study on latency reduction techniques for LTE (Release 13)", the entireties of which are incorporated herein by reference. Among other things, these describe control format indicator (CFI) assignment procedures, physical control format indicator channel (PCFICH), which carries information about the number of OFDM symbols used for transmission of PDCCHs in a subframe, resource-element groups (REGs) used for defining the mapping of control channels to resource elements, enhanced resource-element groups (EREGs) used for defining the mapping of enhanced control channels to resource elements, and formats for EPDCCH, which carries scheduling assignments.

Thus, it is understood that downlink control information (DCI) would be carried on one or more control channel, e.g., PDCCH/ePDCCH. For instance, DCI may be used to carry scheduling for downlink data or uplink data. In addition, DCI may also be used carry special messages, e.g., triggering some procedure or control UE power, from eNB to the UE, etc. Conventionally, different DCI formats exist to serve aforementioned different purposes. As an example using downlink data scheduling, DCI for downlink data scheduling may comprise the resource allocation (in the frequency domain), modulation and coding scheme, redundancy version, HARQ process ID, and other information require to perform the reception, for example, as further described in 3GPP TS 36.212 V13.1.0, "E-UTRA Multiplexing and channel coding (Release 13)", the entirety of which is incorporated herein by reference, which, among other things, describes conventional DCI formatting.

As a result, because different DCI formats may have different payload sizes and a UE may need to acquire different DCI formats, the UE is required to decode several decoding candidates without knowing which or whether candidate exist, which is known as blind decoding. The resource of decoding candidate(s) is known as a search space of the UE, and the search space is further partitioned to common search space and UE specific search space which may contain different type of messages. Within search space, the UE may search for different DCI format. Also, within search space, the UE would monitor control channel addressed different identifier, e.g., Radio Network Temporary Identifier (RNTI), which can be done by descrambling cyclic redundancy check (CRC) of a decoding candidate with different RNTI and check which one would pass the check, for example, similar to related procedures described in 3GPP TS 36.213 v13.1.1, "E-UTRA Physical layer procedures (Release 13)", and 3GPP TS 36.212 V13.1.0, "E-UTRA Multiplexing and channel coding (Release 13)," directed to UE monitoring of PDCCH/ePDCCH and assignment, UE receiving and decoding PDCCH/ePDCCH and corresponding PDSCH, DCI composition and coding, and so on.

Accordingly, it is understood that timing relationships between control channel and data channel is specified in LTE. For instance, when a UE receives a control channel in a subframe, n, for scheduling downlink data, the associated downlink data would located in the data region of the same subframe, n. And it would transmit corresponding HARQ feedback in a specific subframe after the reception, e.g., in subframe, n+4. For the downlink data reception, asynchronous HARQ is applied, e.g., the retransmission timing is not tied to the feedback timing. Therefore, HARQ process ID would be required for the DL data scheduling. For the UL data scheduling, when a UE receives a control channel in a subframe, n, for scheduling uplink data, the associated downlink data would located in subframe, n+4. For UL data, there is no control region as the control/data are multiplexed in frequency domain and UL data can occupy all symbols in a subframe within the allocated resource, except for those may be occupied by reference signal (RS). And it would expect corresponding HARQ feedback or a retransmission grant in a specific subframe after the reception, e.g., in subframe, n+4. For the uplink data transmission, synchronous HARQ is applied, e.g., the retransmission timing is tied to the feedback timing. Therefore, HARQ process ID is not required for the UL data scheduling. Such detail timing and related procedures are described, for example, in 3GPP TS 36.213 v13.1.1, "E-UTRA Physical layer procedures (Release 13)", directed to UE procedures for receiving/transmitting PDSCH/PUSCH, Physical Hybrid-ARQ Indicator Channel (PHICH) assignment procedures, and UL HARQ-ACK timing, etc.

As a result of these and further studies, a control signal, sPDCCH (PDCCH for short TTI), is proposed to accommodate the shorter TTI length, and in addition, it is proposed that short TTI on DL may contain sPDCCH decoding candidates, where a maximum number of blind decondings (BDs) will be defined for sPDCCH in UE-specific search space (USS) and where any DCI for sTTI scheduling carried on PDCCH may be taken into account in the maximum total number of BDs, in the event that 2-level DCI is adopted.

Besides the timing domain structure, a two-level DCI structure is proposed to minimize anticipated increase of control overhead when employing shortened TTI, for example such as described for a slow DCI and a fast DCI with TTI structures with different TTI lengths in R1-163068, "DL channel design for shortened TTI", Qualcomm Incorporated, the entirety of which is incorporated herein by reference.

That is, instead of carrying all the information required for one TTI data reception as in conventional systems, some control information in a DCI, called slow DCI, which may not vary from time to time may be common for multiple TTI and could be signaled once, but not in every TTI, for which UE would assume the same content applied for multiple TTIs, for example, as described below regarding FIG. 4. As there would still be some information which would vary between TTIs, some control information in a DCI, called fast DCI, would be signal for each TTI, for example, as described below regarding FIG. 4. For receiving data in one TTI, UE may need to combine/concatenate slow DCI and fast DCI to obtain the required information.

For instance, for a proposed two-level DCI, slow DCI, can comprise DCI content, which applies to more than one sTTI and can be carried on either legacy PDCCH, or sPDCCH transmitted not more than once per subframe, whereas fast DCI can comprise DCI content, which applies to a specific sTTI and can be carried on sPDCCH. In addition, for a sPDSCH in a given sTTI, the scheduling information is obtained from either a combination of slow DCI and fast DCI, or fast DCI only, overriding the slow DCI for that sTTI.

Furthermore, it is proposed, regarding handling transmissions with different TTI length, UE can be expected to handle, in the same carrier in a subframe, receiving legacy TTI non-unicast PDSCH and short TTI unicast PDSCH, and receiving legacy TTI non-unicast PDSCH and legacy TTI unicast PDSCH(s). In addition, it is proposed that a UE can be dynamically scheduled (with subframe to subframe granularity) with PUSCH and/or sPUSCH, but a UE is not expected to transmit PUSCH and sPUSCH simultaneously on the same resources, e.g., by superposition.

Accordingly, while an overview of relevant technologies has been described above in order to provide a basic understanding of some aspects of the specification, various non-limiting devices, systems, and methods are now described as a further aid in understanding the advantages and benefits of various embodiments of the disclosed subject matter.

Figure 3:
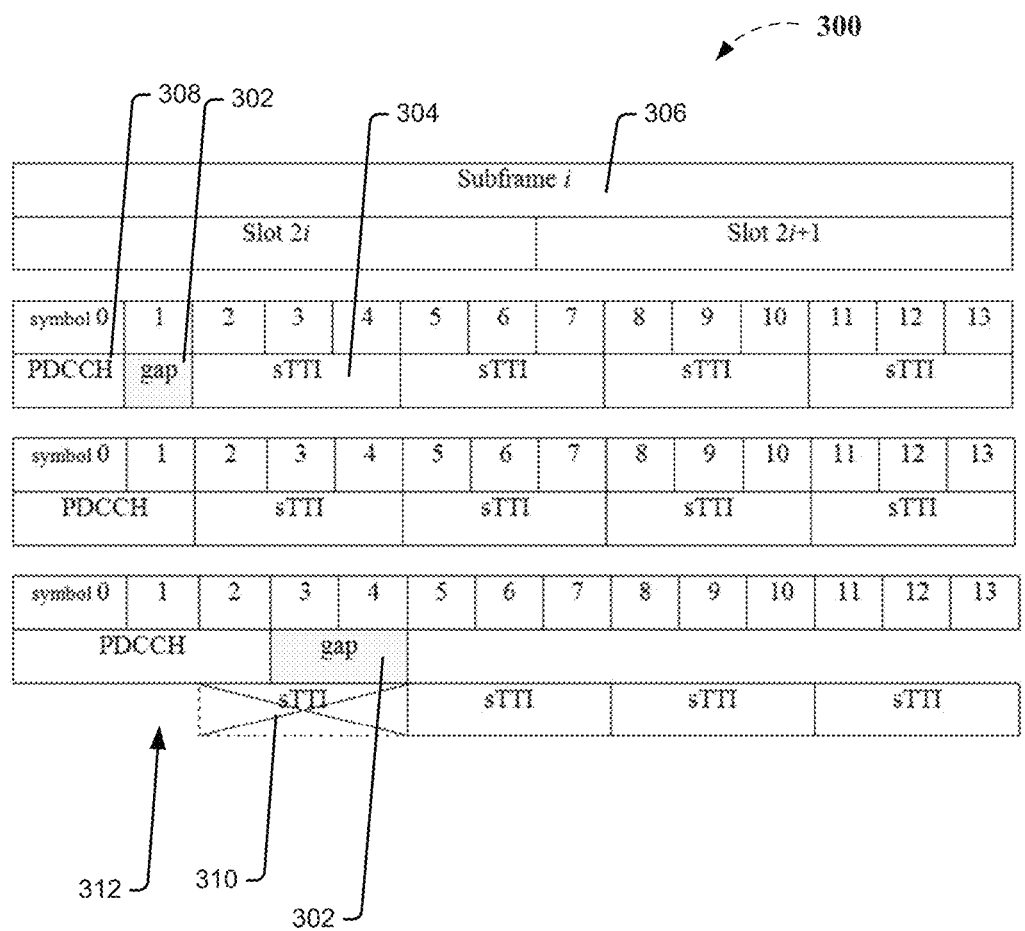
FIG. 3 depicts an exemplary instance of a short TTI (sTTI) pattern in the time domain, demonstrating a potential for interference or gaps or unused resources, wherein some resources in the gap cannot be utilized by sPDCCH/sPDSCH/PDCCH, without control format indicator (CFI) consideration, according to non-limiting aspects.

FIG. 3 depicts an exemplary instance of a short TTI (sTTI) pattern 300 in the time domain, demonstrating a potential for interference or gaps 302 or unused resources, wherein some resources in the gap 302 cannot be utilized by sPDCCH/sPDSCH/PDCCH, without control format indicator (CFI) consideration, according to non-limiting aspects. As described, for short TTI 304, noted as sTTI, sPDCCH (or PDCCH for sTTI) (not shown) is designed for at least scheduling DL data or UL data transmission. Each sTTI 304 on DL may contain sPDCCH decoding candidates. The sPDSCH scheduled by a sPDCCH may be allocated to unused resources in the scheduled sTTI 304 wherein the sPDCCH and sPDSCH are TDM. The frequency resources of the sPDSCH and the sPDCCH may be the same, but the symbols of the sPDSCH and the sPDCCH are separated within one sTTI 304.

Firstly, for acquiring sPDCCH and/or sPDSCH, a UE (e.g., UE device configured to employ short TTI and comprising AT 116, AT 122, receiver system 204, or portions thereof, and/or as further described herein regarding FIGS. 12-18, etc.) requires the sTTI pattern/sPDCCH pattern to know how sTTIs/sPDCCHs are distributed within a subframe 306. Since the sPDCCH region is improper to overlap with PDCCH region 308 (as indicated in 310), a fixed sTTI pattern may induce interference or gap considering different PDCCH region 308. As shown in FIG. 3, if PDCCH region 308 is one symbol, the symbol #1 312 results in a gap wherein some resources in the gap 302 cannot be utilized by sPDCCH/sPDSCH/PDCCH. If PDCCH region 308 is three symbols, it induces interference in symbol #2 314 if the overlapped sTTI 304 transmission transmits or it induces gap 302 in symbol #3 #4 if the overlapped sTTI 304 transmission does not transmit. Thus, CFI value representing PDCCH region 308 size may be considered for determine sTTI pattern, in a non-limiting aspect. The CFI consideration can not only avoid collision between sPDCCH region (not shown) and PDCCH region 308, but also avoid gap 302 generation, in a further non-limiting aspect. Thus, FIG. 3 depicts an instance of sTTI 304 pattern without CFI consideration. For indicating sTTI pattern/sPDCCH pattern in time domain, there are some alternatives, in still other non-limiting aspects.

As a non-limiting example, an exemplary sTTI/sPDCCH pattern can be indicated by CFI, for example, as further described herein. For instance, when a UE (e.g., UE device configured to employ short TTI and comprising AT 116, AT 122, receiver system 204, or portions thereof, and/or as further described herein regarding FIGS. 12-18, etc.) is configured with TTI shortening, the UE can be configured to derive the sTTI/sPDCCH pattern based at least in part on the CFI value in the subframe 306. In a non-limiting aspect, corresponding sTTI/sPDCCH patterns could be different for different CFI values. In yet another non-limiting aspect, the sTTI/sPDCCH pattern for a specific CFI value may be configured via a higher layer or specified. Moreover, the sTTI/sPDCCH pattern may be relevant to the configured sTTI 304 size. Furthermore, some CFI values may mean that there is no short TTI 304 scheduling or no sPDCCH transmission in the subframe 306. For instance, if a UE configured with TTI shortening detects CFI=1 or 3, for example, the UE can be configured to neither monitor sPDCCH nor receive sPDSCH in the subframe 306.

As a further non-limiting example, an exemplary sTTI/sPDCCH pattern can be indicated by CFI and a special PDCCH, for example, as further described herein. In an exemplary embodiment, the special PDCCH can be configured to indicate how sTTIs/sPDCCHs are distributed within a subframe 306, except the PDCCH region 308 indicated by CFI, in a non-limiting aspect. Furthermore, a field in DCI content carried on the special PDCCH can be configured to indicate the sTTI/sPDCCH pattern, in a further non-limiting aspect. In addition, for different CFI values, a field value may be configured to correspond to different sTTI/sPDCCH pattern, in yet another non-limiting aspect.

As yet another non-limiting example, an exemplary sTTI/sPDCCH pattern can be indicated by a special PDCCH, for example, as further described herein. An exemplary special PDCCH can be configured to indicate how sTTIs/sPDCCHs are distributed within a subframe 306, for example, as further described above. Furthermore, a field in DCI content carried on the special PDCCH can be configured to indicate the sTTI/sPDCCH pattern, as described above. In addition, for different CFI values, a field value may be configured to correspond to the same sTTI/sPDCCH pattern. Moreover, an exemplary network can be configured to determine sTTI/sPDCCH pattern considering PDCCH region 308 size. In this non-limiting example, it is noted that it is possible to induce a timing gap 302 wherein some resources in the timing gap 302 cannot be utilized by sPDCCH/sPDSCH/PDCCH.

Figure 4:
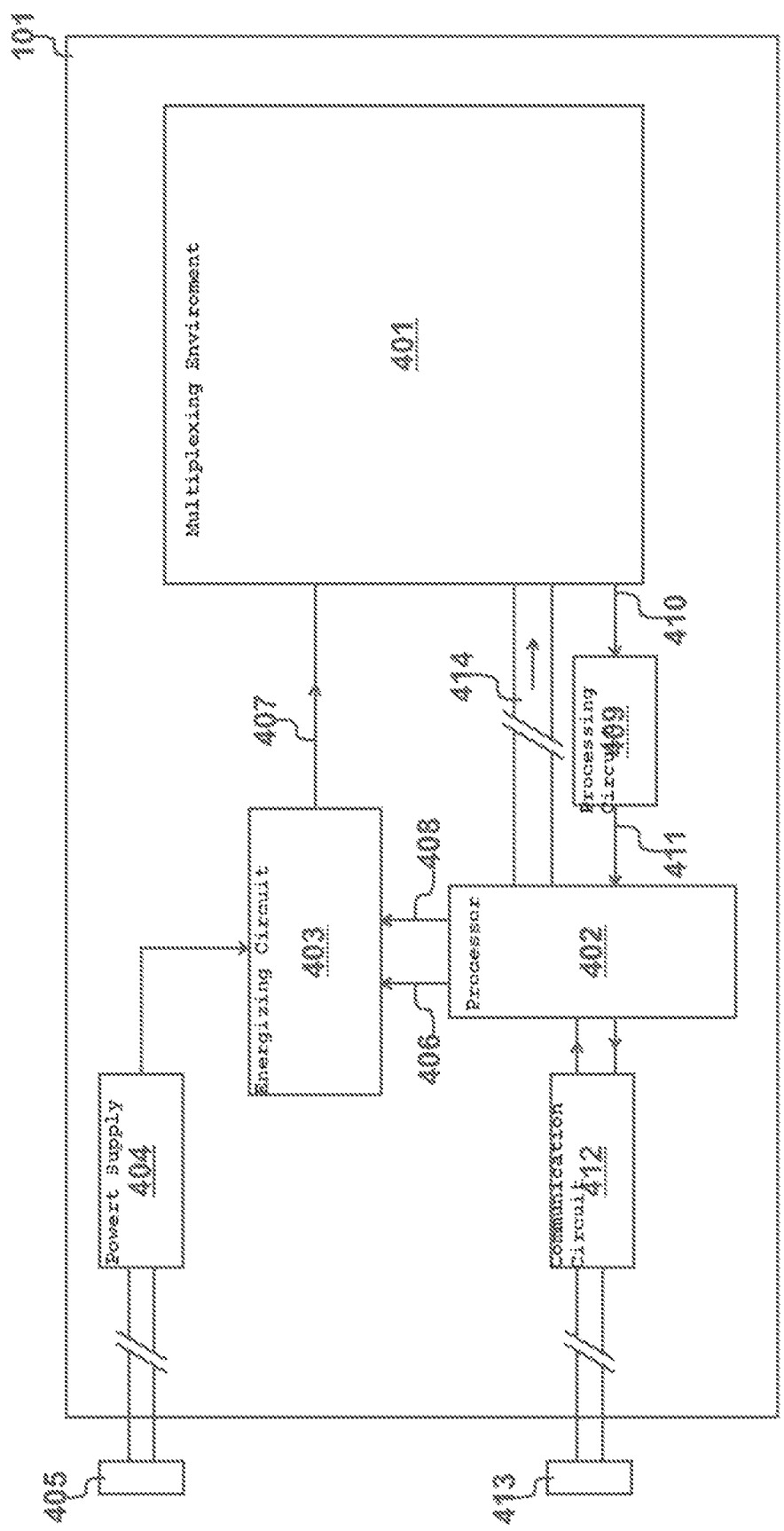
FIG. 4 illustrates an exemplary 2-stage downlink control information (DCI) structure comprising an exemplary slow DCI for PDCCH, and an exemplary fast DCI for sPDCCH, and sPDSCH, in further non-limiting aspects.

FIG. 4 illustrates an exemplary 2-stage downlink control information (DCI) structure 400 comprising an exemplary slow DCI 402 for PDCCH 308, and an exemplary fast DCI 404 for sPDCCH 406, and sPDSCH 408, in further non-limiting aspects. Secondly, for sPDCCH 406 scheduling, two-level DCI structure can be employed to facilitate reducing DL control overhead when TTI shortening is configured for a UE (e.g., UE device configured to employ short TTI and comprising AT 116, AT 122, receiver system 204, or portions thereof, and/or as further described herein regarding FIGS. 12-18, etc.). The slow DCI 402 may carry the common DCI content which applies to more than one sTTI 304 within a subframe 306, as further described herein. The slow DCI 402 may be UE-specific or common for multiple UEs and may be transmitted on legacy PDCCH or sPDCCH 406 transmitted not more than once per subframe 306, as described above. As further described above, the fast DCI 404 may be transmitted on sPDCCH 406 and can be configured to carry DCI content that applies to a specific sTTI 304.

The UE (e.g., UE device configured to employ short TTI and comprising AT 116, AT 122, receiver system 204, or portions thereof, and/or as further described herein regarding FIGS. 12-18, etc.) can know sPDCCH 406 decoding candidates for fast DCI 404 based on sTTI/sPDCCH pattern, in a non-limiting aspect. The special PDCCH described above may be the PDCCH carrying slow DCI 402. That is, the slow DCI 402 received in a subframe 306 can be configured to include the information of sTTI/sPDCCH pattern for the subframe 306. Thus, FIG. 4 shows a structure instance of slow DCI 402 on PDCCH, fast DCI 404 on sPDCCH 406, and sPDSCH 408. The frequency resource allocation information for the sPDCCH 406 and/or sPDSCH 408 may be included in the slow DCI 402, in a non-limiting aspect. However, available resources for sPDSCH 408 are restricted by the interval of sPDCCH 406 occasions. As a result, to obtain more flexibility of available sPDSCH 408 resources, available OFDM symbol occasions for a scheduled sPDSCH 408 can be indicated by the scheduling sPDCCH 406, in a further non-limiting aspect. As a result, an exemplary sPDCCH 406 can have flexibility to perform timing scheduling, including number of OFDM symbols and/or the OFDM symbol occasions, for a scheduled sPDSCH 408, in various non-limiting embodiments.

Figure 5:
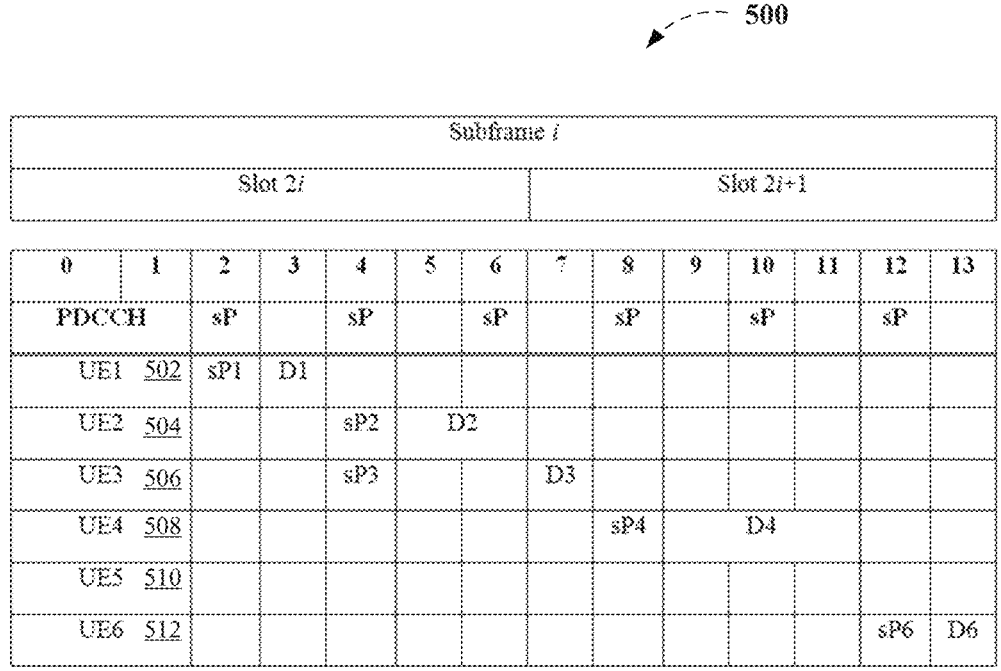
FIG. 5 depicts an exemplary resource scheduling pattern in the time domain for available sPDSCH resources, wherein available OFDM symbol occasions for a scheduled sPDSCH can be indicated by a scheduling sPDCCH in addition to timing scheduling, including number of OFDM symbols, OFDM symbol occasions, etc. for a scheduled sPDSCH, in further non-limiting aspects.

As a non-limiting example, FIG. 5 depicts an exemplary resource scheduling pattern 500 in the time domain for available sPDSCH 408 resources, wherein available OFDM symbol occasions for a scheduled sPDSCH 408 can be indicated by a scheduling sPDCCH 406 in addition to timing scheduling, including number of OFDM symbols, OFDM symbol occasions, etc. for a scheduled sPDSCH 408, in further non-limiting aspects. Thus, as an instance for UEs (e.g., UE device configured to employ short TTI and comprising AT 116, AT 122, receiver system 204, or portions thereof, and/or as further described herein regarding FIGS. 12-18, etc.) 502512, shown in FIG. 5, the sPDCCH1 (sP1) for UE1 502 indicate one OFDM symbol for the scheduled sPDSCH1 (D1); the sPDCCH2 (sP2) for UE2 504 indicates two OFDM symbols for the scheduled sPDSCH2 (D2); the sPDCCH3 (sP3) for UE3 506 indicates one OFDM symbol occasion for the scheduled sPDSCH3 (D3); the sPDCCH4 (sP4) for UE4 508 indicates three OFDM symbol occasions for the scheduled sPDSCH4 (D4), and so on. Thus, the network could utilize sPDCCH 406 resources for sPDSCH 408 transmission, and it could be transparent to UEs, except the scheduled UEs 502-512.

Thirdly, determining the associated sPUCCH resources for HARQ-ACK feedback after a UE (e.g., UE device configured to employ short TTI and comprising AT 116, AT 122, receiver system 204, or portions thereof, and/or as further described herein regarding FIGS. 12-18, etc.) receives sPDCCH 406 and/or sPDSCH 408 transmission can be performed as described herein, in further non-limiting aspects. For instance, considering that TTI shortening can induce processing time reduction on sPDCCH/sPDSCH, the earliest timing for a HARQ-ACK feedback may be $N \times sTTI_{DL}$ after sPDCCH 406 and/or sPDSCH 408 reception. The $sTTI_{DL}$ may be the sTTI length for DL, including a sPDCCH 406 transmission and an associated sPDSCH 408 transmission. As further described herein, some alternatives for sPUCCH resources (not shown) derivation for HARQ-ACK feedback are provided in further non-limiting aspects. Note that, for purposes of describing alternatives for sPUCCH resources derivation for HARQ-ACK feedback, the DL sTTI length may be different from the UL sTTI length.

In a first non-limiting example (denoted Alternative i in FIGS. 6-8), when a UE (e.g., UE device configured to employ short TTI and comprising AT 116, AT 122, receiver system 204, or portions thereof, and/or as further described herein regarding FIGS. 12-18, etc.) receives sPDCCH 406 and/or sPDSCH 408 in a sTTI 304, the associated sPUCCH resource for HARQ-ACK feedback can be the first available sPUCCH after $N \times sTTI_{DL}$, and in a non-limiting aspect, N=3. For the non-limiting case where DL sTTI 304 length is larger than or equal to UL sTTI 304 length, there may be some UL sTTIs 304 without associated sPDCCH 406 and/or sPDSCH 408 reception. Accordingly, in a further non-limiting aspect, to balance the sPUCCH resource utilization, a time offset/delay can be introduced for sPUCCH resource determination. For instance, if the time offset/delay is zero, the associated sPUCCH resource is the first available sPUCCH after $N \times sTTI_{DL}$, in a non-limiting aspect. In a further non-limiting aspect, if the time offset/delay is not zero, e.g., one, etc. the associated sPUCCH resource is the next one of the first available sPUCCH after $N \times sTTI_{DL}$. Thus, an exemplary time offset/delay can be configured or indicated in sPDCCH 406 or indicated in slow DCI 402. With an exemplary time offset/delay, the network can be configured to multiplex two sPDCCH 406 regions separated in frequency domain into the same sPUCCH region via time-division multiplexing, in yet another non-limiting aspect. Furthermore, the frequency resource allocation of sPDCCH 406 region can be configured or indicated via slow DCI 402 on PDCCH addressed via a special RNTI, as further described herein. In another non-limiting aspect, different UEs can be configured with different sPDCCH 406 regions in frequency domain or configured with different special RNTI for slow DCI 402 detection. In addition, an exemplary time offset/delay can also be utilized for avoiding collision of sPUCCH and SRS. Note that the multiple sPDSCH 408 transmissions in different sTTIs 304 within one DL subframe may not be associated with sPUCCH resources for HARQ-ACK feedback within the same UL subframe, however.

In a second non-limiting example (denoted Alternative ii in FIGS. 6-8), multiple sPDSCH 408 transmissions in different sTTIs 304 within one DL subframe can be associated into sPUCCH resources for HARQ-ACK feedback within one UL subframe. For instance, subframe-based association can be readily configured for network scheduling, in further non-limiting aspects. For example, one exemplary embodiment can comprise a UE (e.g., UE device configured to employ short TTI and comprising AT 116, AT 122, receiver system 204, or portions thereof, and/or as further described herein regarding FIGS. 12-18, etc.), which can be configured to receive sPDCCH 406 and/or sPDSCH 408 in a sTTI 304, wherein the associated sPUCCH resource for HARQ-ACK feedback is the first available sPUCCH after $N \times sTTI_{DL}+k$, wherein k induces same UL subframe association for all sPDSCH 408 transmissions in different sTTIs 304 within one DL subframe. In another exemplary embodiment, a UE can be configured to receive sPDCCH 406 and/or sPDSCH 408 in a sTTI 304, wherein the associated sPUCCH resource for HARQ-ACK feedback is within some time offset/delay of the first available sPUCCH after $N \times sTTI_{DL}$, in a further non-limiting aspect. An exemplary time offset/delay can be specified, configured, and/or indicated via L1 signaling, such that same UL subframe association for all sPDSCH 408 transmissions in different sTTIs 304 within one DL subframe, in yet another non-limiting aspect.

Figure 6:
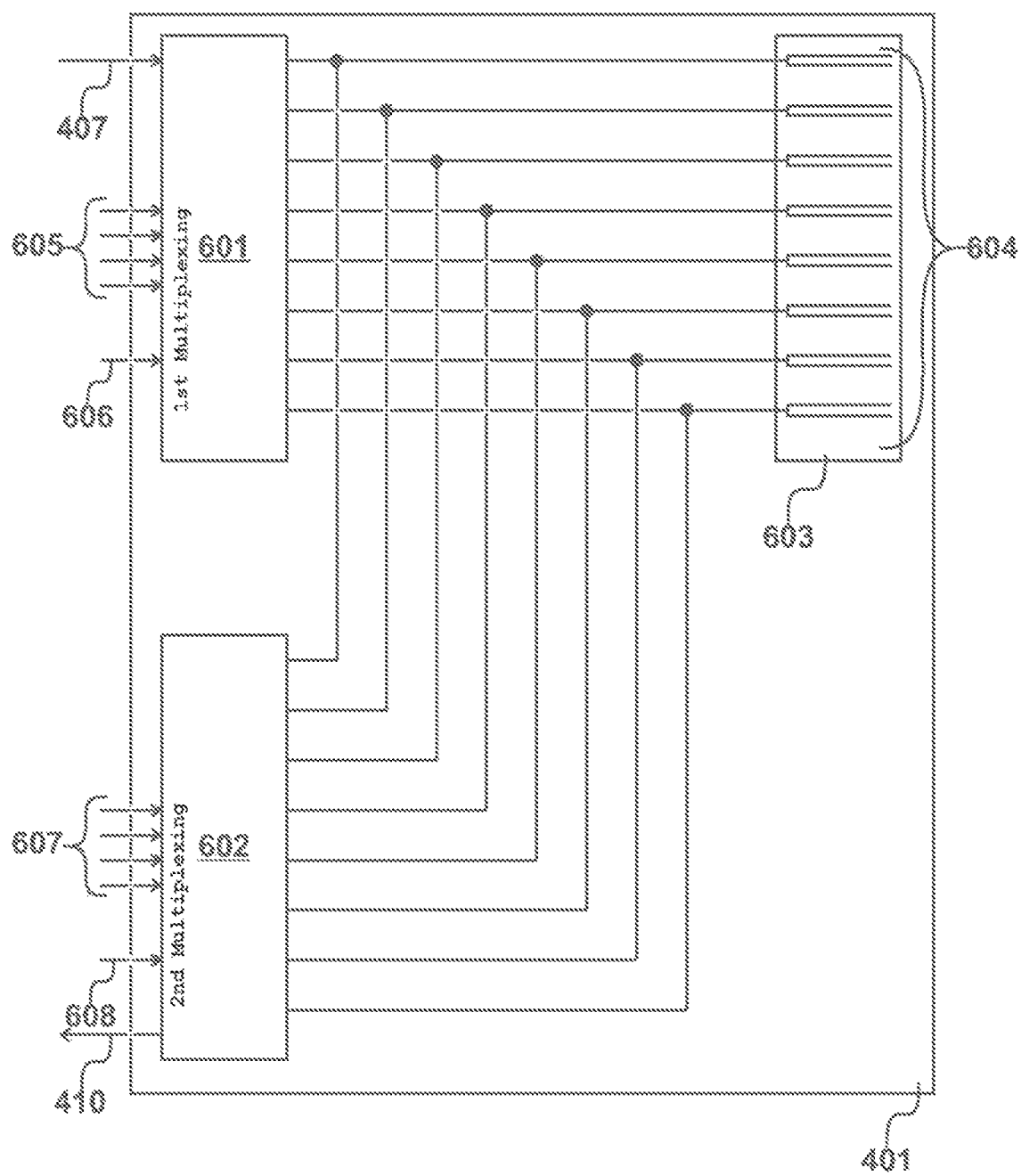
FIG. 6 depicts an exemplary aspect of a non-limiting resource scheduling pattern demonstrating exemplary sPUCCH resources derivation after a UE receives sPDCCH and/or sPDSCH transmission, wherein DL sTTI (including sPDCCH and sPDSCH)>sTTI of sPUCCH, in further non-limiting embodiments.
Figure 7:
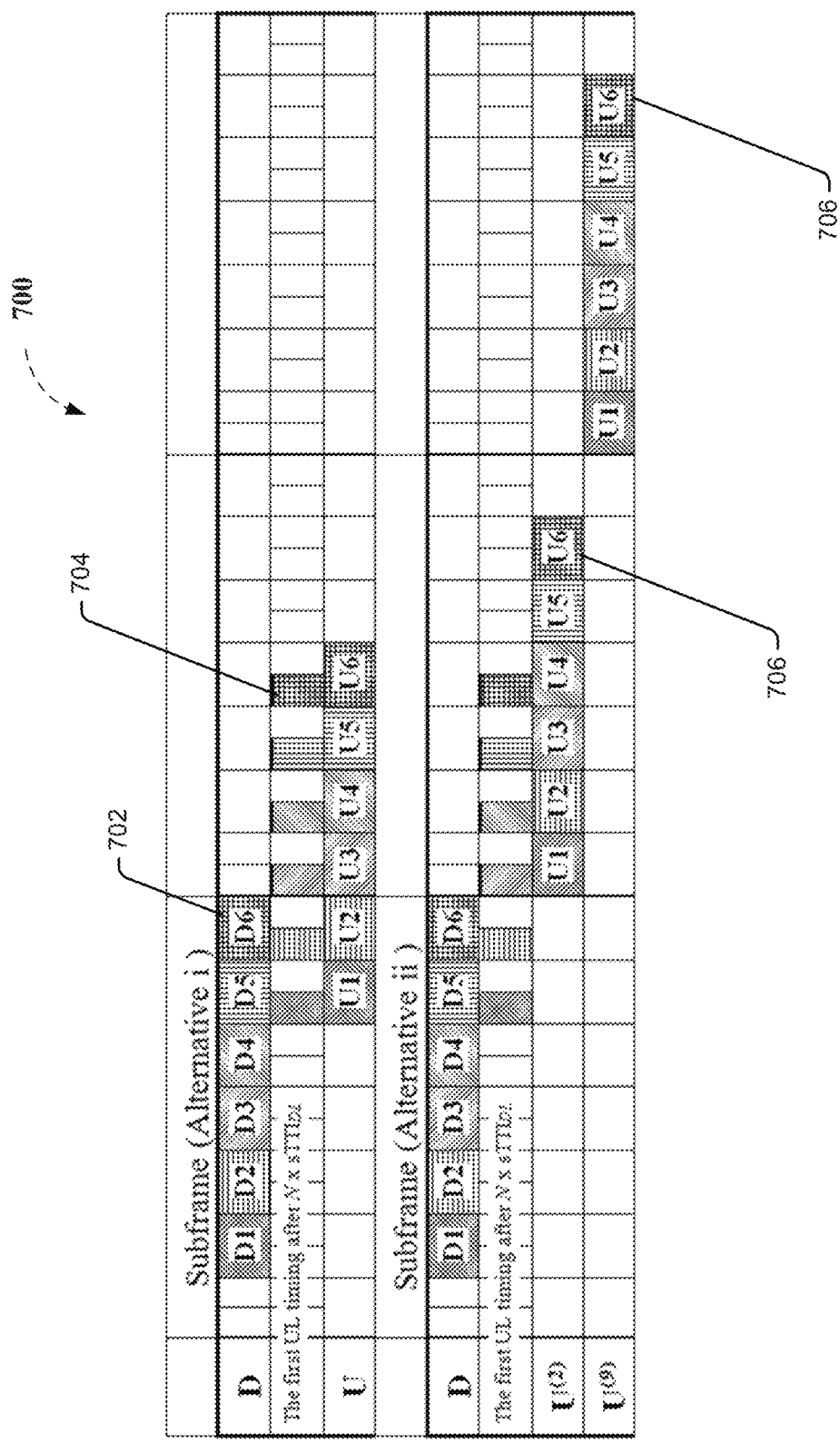
FIG. 7 depicts an exemplary aspect of a non-limiting resource scheduling pattern demonstrating exemplary sPUCCH resources derivation after a UE receives sPDCCH and/or sPDSCH transmission, wherein DL sTTI (including sPDCCH and sPDSCH) equal to sTTI of sPUCCH, in still further non-limiting embodiments.
Figure 8:
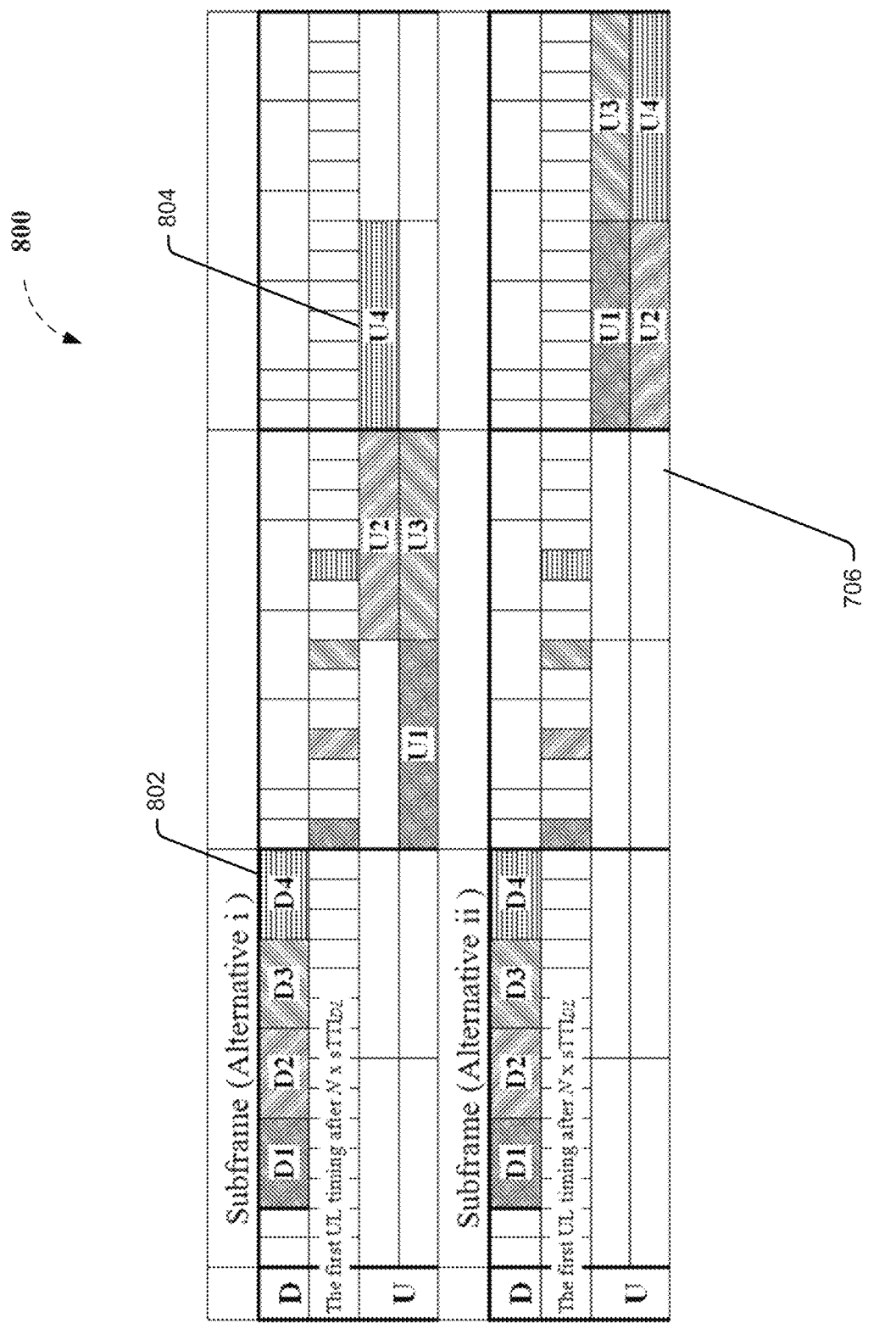
FIG. 8 depicts an exemplary aspect of a non-limiting resource scheduling pattern demonstrating exemplary sPUCCH resources derivation after a UE receives sPDCCH and/or sPDSCH transmission, wherein DL sTTI (including sPDCCH and sPDSCH) is less than sTTI of sPUCCH, in yet another non-limiting embodiment.

As non-limiting examples, FIGS. 6-8 depict non-limiting instances demonstrating exemplary difference between the two non-limiting examples described above. As a non-limiting example, FIG. 6 depicts an exemplary aspect of a non-limiting resource scheduling pattern 600 demonstrating exemplary sPUCCH resources derivation after a UE (e.g., UE device configured to employ short TTI and comprising AT 116, AT 122, receiver system 204, or portions thereof, and/or as further described herein regarding FIGS. 12-18, etc.) receives sPDCCH 406 and/or sPDSCH 408 transmission, wherein DL sTTI (including sPDCCH 406 and sPDSCH 408) is greater than sTTI of sPUCCH, in further non-limiting embodiments. Note that an exemplary time offset/delay can be set differently for slow DCI 402 on PDCCH 308 addressed via different special RNTI 602 604, as further described herein. In addition, note that $D_{ij}$ refers to j-th sTTI DL transmission, which comprises sPDCCH 406 and sPDSCH 408, wherein the sPDCCH 406 region in frequency domain is indicated via slow DCI 402 on PDCCH 308 addressed via a special RNTI-i (e.g., RNTI 602 604), in a non-limiting aspect. Note further that $U_{ij}$ refers to the sPUCCH 606 transmission associated with $D_{ij}$. The time offset/delay is zero for slow DCI 402 on PDCCH 308 addressed via special RNTI1, and is not zero, e.g., one, for slow DCI 402 on PDCCH 308 addressed via special RNTI2.

As another non-limiting example, FIG. 7 depicts an exemplary aspect of a non-limiting resource scheduling pattern 700 demonstrating exemplary sPUCCH resources derivation after a UE (e.g., UE device configured to employ short TTI and comprising AT 116, AT 122, receiver system 204, or portions thereof, and/or as further described herein regarding FIGS. 12-18, etc.) receives sPDCCH 406 and/or sPDSCH 408 transmission, wherein DL sTTI (including sPDCCH 406 and sPDSCH 408) equal to sTTI of sPUCCH, in still further non-limiting embodiments. Thus, in a non-limiting aspect, exemplary time offset/delay, k sTTI of sPUCCH, after considering processing time, can facilitate ensuring that all sPDSCH 408 transmissions within one DL subframe are associated with the sPUCCH resources for HARQ-ACK feedback within one UL subframe. In addition, note that $D_j$ refers to j-th sTTI DL transmission (e.g., sTTI DL transmission 702), which comprises sPDCCH 406 and sPDSCH 408, and $U_j$ refers to the sPUCCH transmission associated with $D_j$ (e.g., sPUCCH transmission 704). Note further that U(k) refers to associated sPUCCH resource $U_j$ is with additional time offset/delay, k sTTI of sPUCCH, after considering processing time (e.g., sPUCCH 706). The time offset/delay ensures that all sPDSCH 408 transmissions within one DL subframe are associated with the sPUCCH resources within one UL subframe.

FIG. 8 depicts an exemplary aspect of a non-limiting resource scheduling pattern 800 demonstrating exemplary sPUCCH resources derivation after a UE (e.g., UE device configured to employ short TTI and comprising AT 116, AT 122, receiver system 204, or portions thereof, and/or as further described herein regarding FIGS. 12-18, etc.) receives sPDCCH 406 and/or sPDSCH 408 transmission, wherein DL sTTI (including sPDCCH 406 and sPDSCH 408) is less than sTTI of sPUCCH, in yet another non-limiting embodiment. According to further non-limiting aspects, different time offset/delay for different reception times of sPDCCH 406 and/or sPDSCH 408 can ensure that all sPDSCH 408 transmissions within one DL subframe are associated with the sPUCCH resources for HARQ-ACK feedback within one UL subframe. For instance, note that $D_j$ refers to j-th sTTI DL transmission which comprises sPDCCH 406 and sPDSCH 408 (e.g., sTTI DL transmission 802), and $U_j$ refers to the sPUCCH transmission associated with Dj (e.g., sPUCCH transmission 804)). Note further that two exemplary sPUCCH transmissions within one sTTI of sPUCCH can be separated via CDM or FDM, in a non-limiting aspect. In addition, note that associated sPUCCH resource $U_j$ is within additional time offset/delay after considering processing time, in another non-limiting aspect. Furthermore, different $U_j$ can have different time offset/delay, for example, as described herein, to facilitate ensuring that all sPDSCH 408 transmissions within one DL subframe are associated with the sPUCCH resources within one UL subframe.

It can be understood that, for scheduling sPUSCH transmission, since an exemplary one symbol sPDCCH 406 region may not be able to accommodate more than one sPDCCH 406 transmissions, the sPUSCH and sPDSCH 408 scheduling may be competitive and/or mutually exclusive. In addition, increasing frequency resources of the sPDCCH 406 region for accommodating more than one sPDCCH 406 may restrict sPDSCH 408 to use the same increased frequency resources for sPDSCH 408, which can result in inefficient resource utilization. Moreover, exemplary sPUSCH can utilize different sTTI lengths from DL sTTI length, as further described herein. Furthermore, because sPDCCH 406 occasions are relevant to DL sTTI, including sPDCCH 406 and sPDSCH 408, network scheduling of sPUSCH transmissions without unequal sPDCCH 406 occasions would be complex.

Accordingly, further non-limiting embodiments can facilitate scheduling sPUSCH transmission, for example, by separating sPDCCH 406 regions for scheduling sPUSCH and sPDSCH 408 transmission, in further non-limiting aspects. For instance, an exemplary sPDCCH 406 region for scheduling sPDSCH 408 can be frequency divided from the sPDCCH 406 region for scheduling sPUSCH. In a further non-limiting aspect, an exemplary sPDCCH 406 region for scheduling sPUSCH can comprise sPDCCH 406 carrying an UL grant, wherein a sPDCCH 406 can be carried on part of the symbol(s) within the duration of the DL data channel (e.g., the PDSCH region). More specifically, duration of the DL data channel can be the remaining region excluding PDCCH region 308 within one subframe. In a non-limiting aspect, there is neither sPDCCH 406 carrying DL assignment nor sPDSCH 408 within the sPDCCH 406 region for scheduling sPUSCH. In addition, there is no sPDCCH 406 carrying an UL grant within the sPDCCH 406 region for scheduling sPDSCH 408. Accordingly, a sPDSCH 408 scheduled by a sPDCCH 406 can be allocated to unused resources within the same frequency resources as the scheduling sPDCCH 406 region for the sPDSCH 408.

Figure 9:
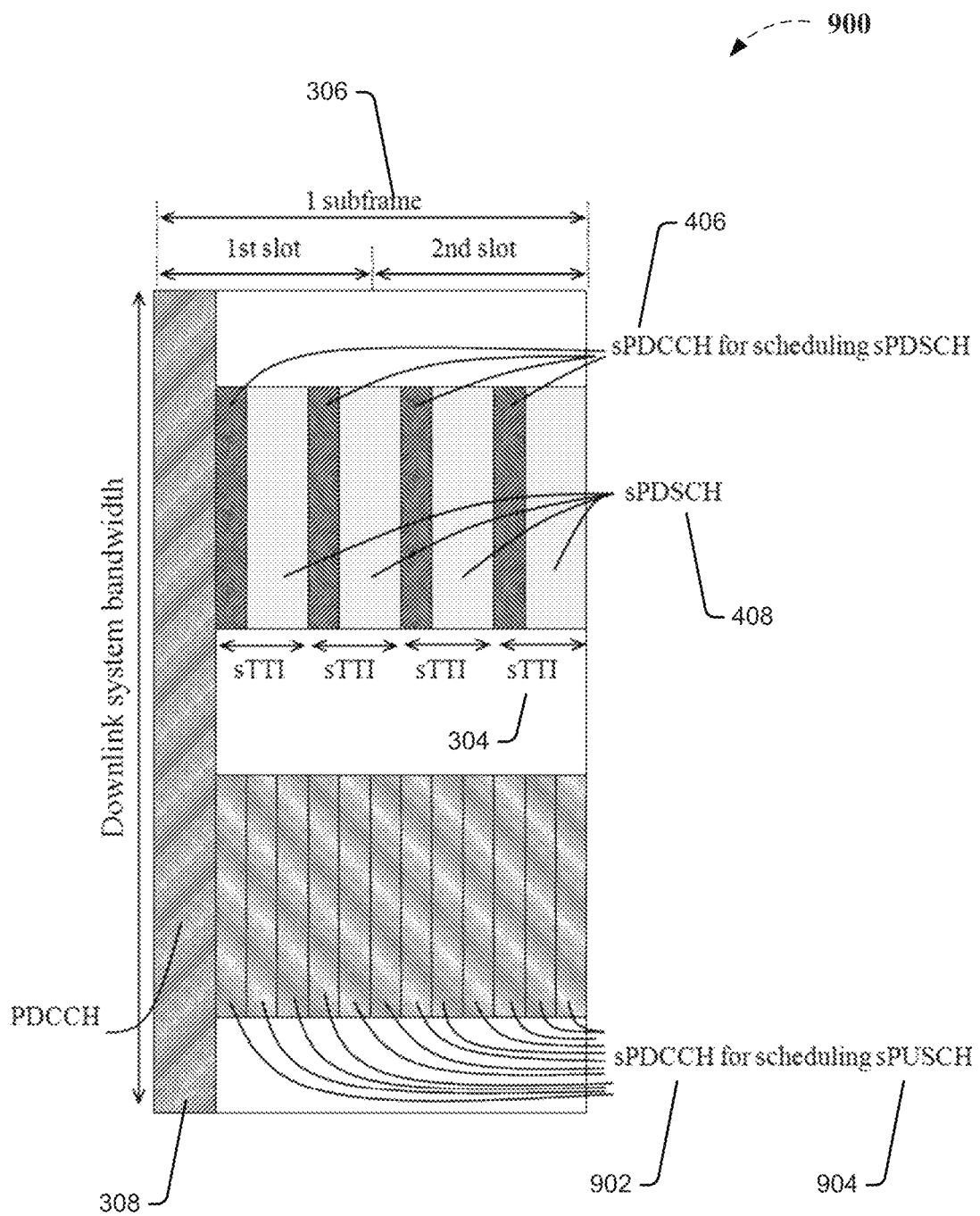
FIG. 9 illustrates an exemplary 2-stage DCI structure comprising an exemplary slow DCI for PDCCH, an exemplary fast DCI for sPDCCH, wherein the sPDCCH region for scheduling sPDSCH can be frequency divided from the sPDCCH region for scheduling sPUSCH, according to further non-limiting aspects.

FIG. 9 illustrates an exemplary 2-stage DCI structure 900 comprising an exemplary slow DCI for PDCCH 308, an exemplary fast DCI for sPDCCH 408, wherein the sPDCCH 406 region for scheduling sPDSCH 408 can be frequency divided from the sPDCCH 902 region for scheduling sPUSCH 904, according to further non-limiting aspects. Thus, FIG. 9 depicts an instance of the frequency divided structure of separated sPDCCH regions (e.g., sPDCCH 406 and sPDCCH 902) for scheduling sPUSCH 904 and sPDSCH 408 transmission. In a non-limiting aspect, the separated sPDCCH regions (e.g., sPDCCH 406 and sPDCCH 902) for scheduling sPUSCH 904 and sPDSCH 408 transmission are not overlapped in frequency domain. One frequency resources region is utilized for sPDCCH 406 for scheduling sPDSCH 408 and the scheduled sPDSCH 408 transmission. The scheduling sPDCCH 406 and the scheduled sPDSCH 408 are transmitted within one DL sTTI 304. Another frequency resources region is utilized only for sPDCCH 902 for scheduling sPUSCH 904. From the perspective of an exemplary eNB, available sPDCCH(s) 406 occasions for scheduling sPDSCH 408 within the one sPDCCH 406 region is smaller than the available sPDCCH(s) 902 occasions for scheduling sPUSCH 904 within the another one sPDCCH 406 region, in a further non-limiting aspect.

In non-limiting embodiments, frequency resource allocation information for the sPDCCH 902 region for scheduling sPUSCH 904 can be included in slow DCI, as further described herein. Exemplary multiple sPDCCHs 902 for scheduling sPUSCHs 904 for different UEs (e.g., UE device configured to employ short TTI and comprising AT 116, AT 122, receiver system 204, or portions thereof, and/or as further described herein regarding FIGS. 12-18, etc.) can be multiplexed via one or more of FDM, TDM, and/or combinations thereof. Considering UE search space design for monitoring sPDCCH 902 candidates, a UE can be configured to monitor all or substantially all OFDM symbols within the sPDCCH 902 region for scheduling sPUSCH 904, in a non-limiting aspect. In other non-limiting aspects, a UE (e.g., UE device configured to employ short TTI and comprising AT 116, AT 122, receiver system 204, or portions thereof, and/or as further described herein regarding FIGS. 12-18, etc.) can be configured to monitor parts of the OFDM symbols within the sPDCCH 902 region for scheduling sPUSCH 904, in still further non-limiting aspects. In addition, determination on the parts of the OFDM symbols can depend on the sTTI 304 length and/or sTTI 304 pattern of sPUSCH 904 for the UE. As a non-limiting example, parts of the OFDM symbols can be separated with an interval equal to sPUSCH 904 sTTI 304 length. Moreover, to facilitate accommodation of the search space of multiple UEs, an exemplary time offset/symbol offset can be utilized to time-division multiplex multiple search spaces within a sPDCCH region 902 for scheduling sPUSCH 904. Furthermore, parts of OFDM symbols for sPDCCH 902 monitoring may be indicated in the slow DCI, as further described herein. As a non-limiting example, exemplary slow DCI can be configured to include information of sPDCCH 902 pattern and/or one or more of sPUSCH 904 sTTI length, time offset, symbol offset, and/or combinations thereof.

In yet another non-limiting aspect, when a UE (e.g., UE device configured to employ short TTI and comprising AT 116, AT 122, receiver system 204, or portions thereof, and/or as further described herein regarding FIGS. 12-18, etc.) receives sPDCCH 902 which schedules sPUSCH 904 transmission, it needs to determine the associated UL sTTI (not shown) for scheduled sPUSCH 904 transmission. Considering that the TTI shortening may induce processing time reduction on preparing sPUSCH signaling, the earliest associated sTTI for sPUSCH 904 transmission may be N'×sTTI$_{UL}$ after sPDCCH 902 reception. The sTTI$_{UL}$ may be the sTTI length for sPUSCH 904 transmission or the interval of monitored sPDCCH 902 occasions. Thus, various embodiments described herein can facilitate providing for such sPUSCH 904 resources derivation.

As a non-limiting example (denoted as Alternative I in FIGS. 10-11), when a UE (e.g., UE device configured to employ short TTI and comprising AT 116, AT 122, receiver system 204, or portions thereof, and/or as further described herein regarding FIGS. 12-18, etc.) receives sPDCCH 902 which schedules sPUSCH 904 transmission, an associated sPUSCH 904 resource can be the first available sPUSCH 904 after N'×sTTI$_{UL}$, and in a non-limiting aspect, N'=3. Because an sPDCCH 902 region can utilize the DL OFDM symbols except for a legacy PDCCH region, there may be some sPUSCH 904 sTTIs (not shown) without associated sPDCCH 902 reception. Accordingly, in a non-limiting aspect, embodiments described herein, can facilitate balancing sPUSCH 904 resource utilization, by employing a UL time offset for some sPDCCH 902 occasions considering sPUSCH 904 resource determination. for instance, if the UL time offset/delay is zero, the associated sPUSCH 904 resource is the first available sPUSCH 904 after N'×sTTI$_{UL}$, in a non-limiting aspect. In another non-limiting aspect, if the UL time offset/delay is not zero, e.g., one, etc., the associated sPUSCH 904 resource is the next one of the first available sPUSCH 904 after N'×sTTI$_{UL}$. Accordingly, an exemplary UL time offset/delay can be configured or indicated in sPDCCH 902, as described herein. Note that the multiple sPDCCH 902 in different sTTIs within one DL subframe may not be associated with sPUSCH 904 resources within the same UL subframe.

Thus, as another non-limiting example (denoted as Alternative II in FIGS. 10-11) multiple sPDCCH 902 in different sTTIs within one DL subframe can be associated into sPUSCH 904 resources within one UL subframe. For instance, subframe-based association can be readily configured for network scheduling. As an exemplary embodiment, when a UE (e.g., UE device configured to employ short TTI and comprising AT 116, AT 122, receiver system 204, or portions thereof, and/or as further described herein regarding FIGS. 12-18, etc.) receives sPDCCH 902 scheduling sPUSCH 904 transmission, the associated sPUSCH 904 resource can be the first available sPUSCH 904 after N'×sTTI$_{UL}$+k', wherein k induces same UL subframe association for all sPDCCH 902 transmissions in different sTTIs within one DL subframe. In another non-limiting embodiment, when a UE receives sPDCCH 902 scheduling sPUSCH 904 transmission, associated sPUSCH 904 resource can be within some exemplary UL time offset/delay of the first available sPUSCH 904 after N'×sTTI$_{UL}$, in a further non-limiting aspect. Accordingly, exemplary UL time offset/delay can be specified, configured, indicated via L1 signaling, for example, as described herein, such that all sPUSCH 904 transmissions within one UL subframe are associated with the sPDCCH 902 resources within one DL subframe.

Figure 10:
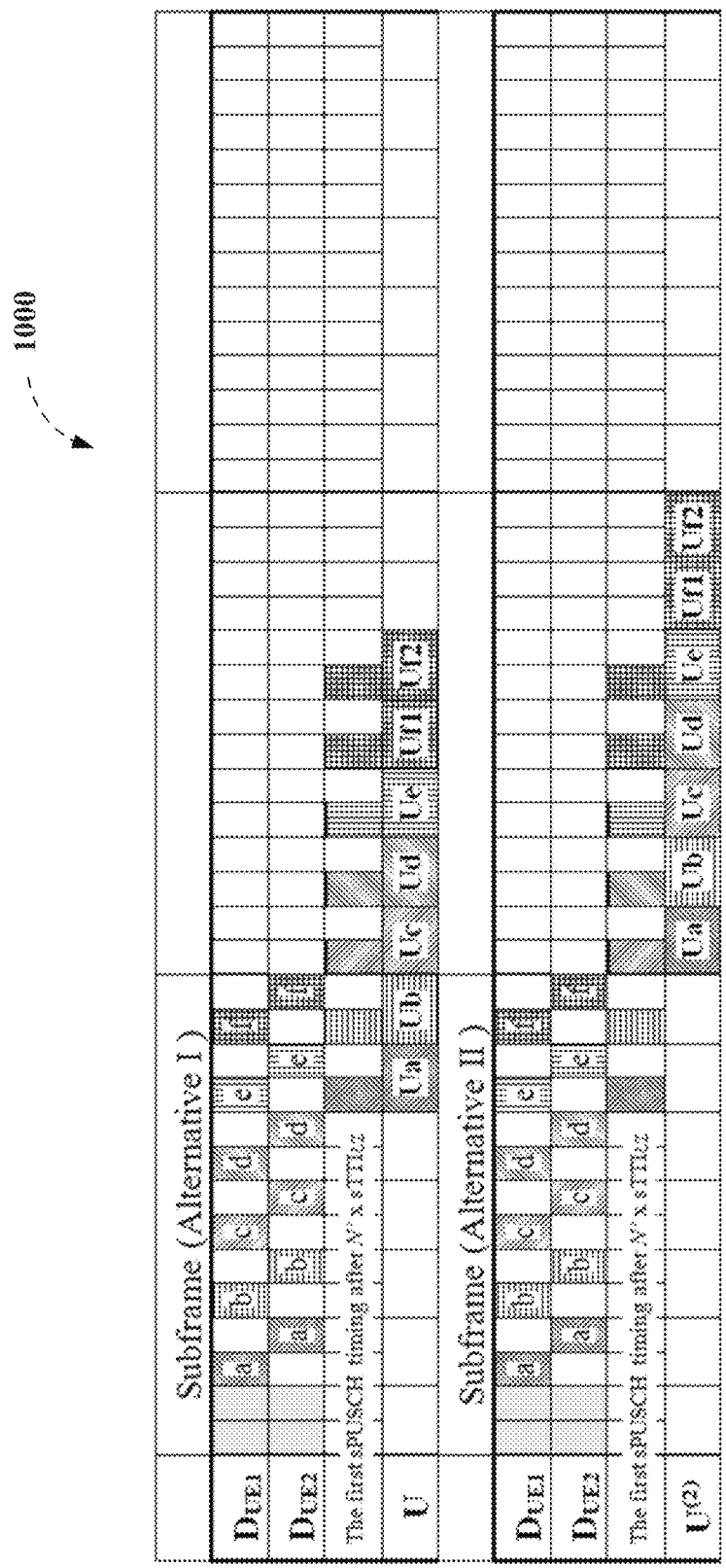
FIG. 10 depicts exemplary aspect of a non-limiting resource scheduling pattern demonstrating exemplary UE determination of the associated UL sTTI for scheduled sPUSCH transmission, after receiving sPDCCH which schedules sPUSCH transmission, to facilitate ensuring that all sPUSCH transmissions within one UL subframe are associated with the sPDCCH resources within one DL subframe, in further non-limiting embodiments.

As a non-limiting example, FIG. 10 depicts exemplary aspects of a non-limiting resource scheduling pattern 1000 demonstrating exemplary UE (e.g., UE device configured to employ short TTI and comprising AT 116, AT 122, receiver system 204, or portions thereof, and/or as further described herein regarding FIGS. 12-18, etc.) determination of the associated UL sTTI for scheduled sPUSCH 904 transmission, after receiving sPDCCH 902 which schedules sPUSCH 904 transmission, to facilitate ensuring that all sPUSCH 904 transmissions within one UL subframe are associated with the sPDCCH 902 resources within one DL subframe, in further non-limiting embodiments. Thus, FIG. 10 depicts sPDCCH 902 and sPUSCH 904 association. For Alternative II, note that exemplary time offset/delay, k' sTTI of sPUSCH 904 (or k intervals of sPDCCH 902 occasions), after considering processing time ensures that all sPUSCH 904 transmissions within one UL subframe are associated with the sPDCCH 902 resources within one DL subframe. Note further that a-f refers to the OFDM symbols for sPDCCH 902 monitoring for a UE (e.g., UE device configured to employ short TTI and comprising AT 116, AT 122, receiver system 204, or portions thereof, and/or as further described herein regarding FIGS. 12-18, etc.), and $U_a$-$U_f$ refers to the associated sPUSCH 904 transmission scheduled by sPDCCH 902 received in OFDM symbols a-f (e.g., a is associated with $U_a$, etc.). In addition, note that f is possibly associated with $U_{f1}$ and $U_{f2}$. Thus, if the time offset/delay is zero, f is associated with $U_{f1}$, in a non-limiting aspect, otherwise, f is associated with $U_{f2}$, in a further non-limiting aspect. In addition, note that for Alternative II, U(k') refers to the situation where the associated sPUSCH 904 $U_a$-$U_f$ is with an exemplary time offset/delay, $_k$' sTTI of sPUSCH 904 (or k intervals of sPDCCH 902 occasions), after considering processing time. As a result, an exemplary offset/delay can be configured to facilitate ensuring that all sPUSCH 904 transmissions within one UL subframe are associated with the sPDCCH 902 resources within one DL subframe.

Figure 11:
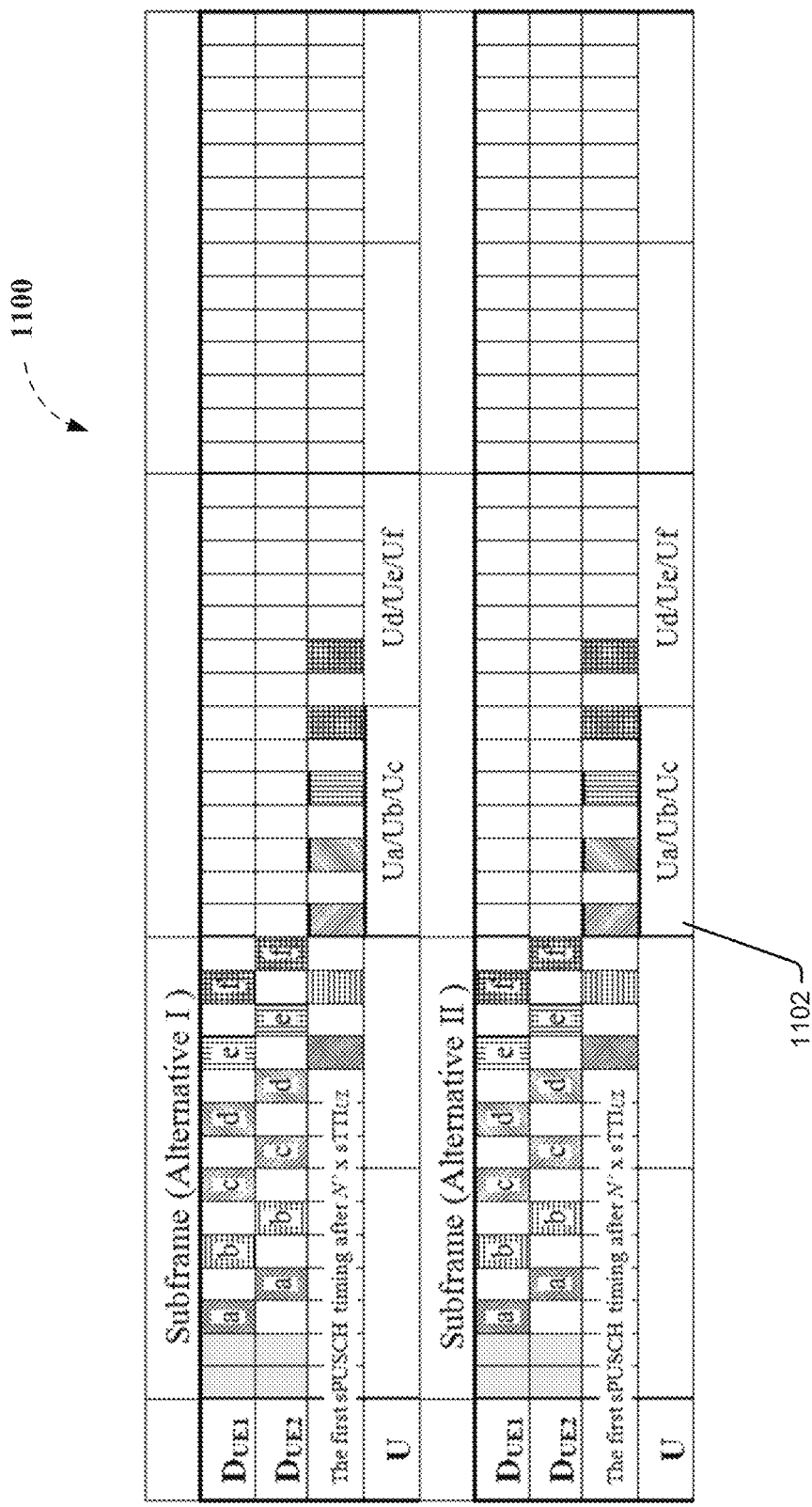
FIG. 11 depicts exemplary aspect of a non-limiting resource scheduling pattern demonstrating exemplary UE determination of the associated UL sTTI for scheduled sPUSCH transmission, after receiving sPDCCH which schedules sPUSCH transmission, to accommodate instances where the number of sPUSCH occasions can be smaller than the number of sPDCCH occasions, and where an sPUSCH occasion may be associated with multiple possible sPDCCHs occasions, in still further non-limiting embodiments.

In yet another non-limiting example, FIG. 11 depicts exemplary aspect of a non-limiting resource scheduling pattern 1100 demonstrating exemplary UE (e.g., UE device configured to employ short TTI and comprising AT 116, AT 122, receiver system 204, or portions thereof, and/or as further described herein regarding FIGS. 12-18, etc.) determination of the associated UL sTTI for scheduled sPUSCH 904 transmission, after receiving sPDCCH 902 which schedules sPUSCH 904 transmission, to accommodate instances where the number of sPUSCH 904 occasions can be smaller than the number of sPDCCH 902 occasions, and where an sPUSCH 904 occasion may be associated with multiple possible sPDCCHs 902 occasions, in still further non-limiting embodiments. As a result, FIG. 11 depicts an instance where the number of sPUSCH 904 occasions is smaller than the number of sPDCCH 902 occasions. Thus, a sPUSCH 904 occasion Can be associated with multiple possible sPDCCHs 902 occasions. As the instance in FIG. 11 shows, the sPUSCH 904 occasion, $U_a/U_b/U_c$, 1102, can be scheduled by sPDCCH 902 received in any of OFDM symbols a, b, c, in a further non-limiting aspect. In yet another non-limiting example, if the UE (e.g., UE device configured to employ short TTI and comprising AT 116, AT 122, receiver system 204, or portions thereof, and/or as further described herein regarding FIGS. 12-18, etc.) has detected UL grant for scheduling a sPUSCH 904 transmission, the UE can be configured to skip detecting other sPDCCH 902 candidates which associate with the same sPUSCH 904 occasion of the scheduled sPUSCH 904 transmission. As the instance in FIG. 10 depicts, the processing time is assumed as $N' \times sTTI_{UL}$, wherein N'=3 and $sTTI_{UL}$ is the intervals of the monitored sPDCCH 902 occasions. Note further that a-f refers to the OFDM symbols for sPDCCH 902 monitoring for a UE (e.g., UE device configured to employ short TTI and comprising AT 116, AT 122, receiver system 204, or portions thereof, and/or as further described herein regarding FIGS. 12-18, etc.), and Ua-Uf refers to the associated sPUSCH 904 transmission scheduled by sPDCCH 902 received in OFDM symbols a-f (e.g., a is associated with Ua, etc.). In addition, note that, since the number of sPUSCH 904 occasions is more than the number of sPDCCH 902 occasions, a sPUSCH 904 occasion can be associated with multiple possible sPDCCHs 902 occasions (e.g., the sPUSCH 904 occasion, Ua/Ub/Uc, 1102, can be scheduled by sPDCCH 902 received in any of OFDM symbols a, b, c, in a non-limiting aspect. In a further non-limiting aspect, processing time is assumed as $N' \times sTTI_{UL}$, wherein N'=3 and $sTTI_{UL}$ is the intervals of sPDCCH 902 occasions, as further described above.

Figure 12:
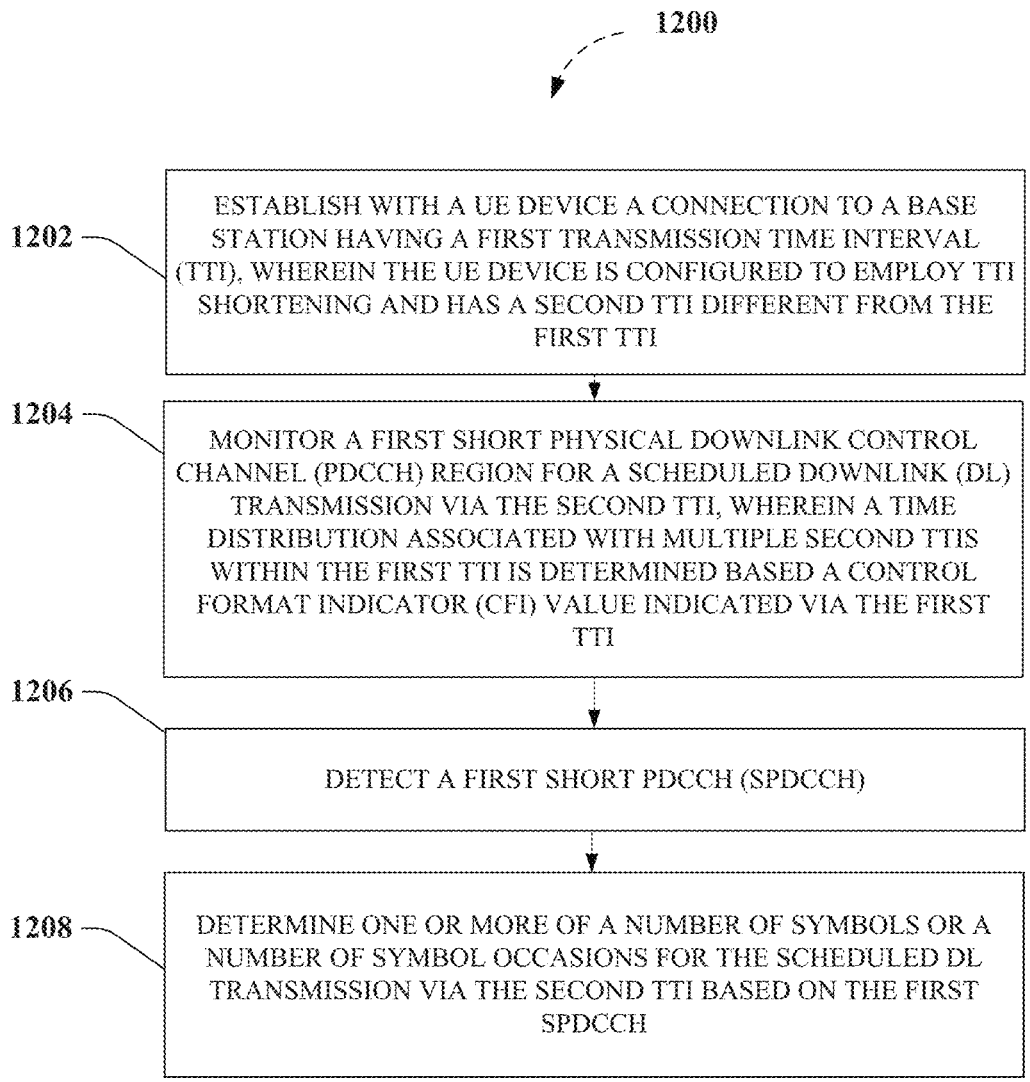
FIG. 12 illustrates an exemplary non-limiting flow diagram of methods for performing aspects of embodiments of the disclosed subject matter.
Figure 13:
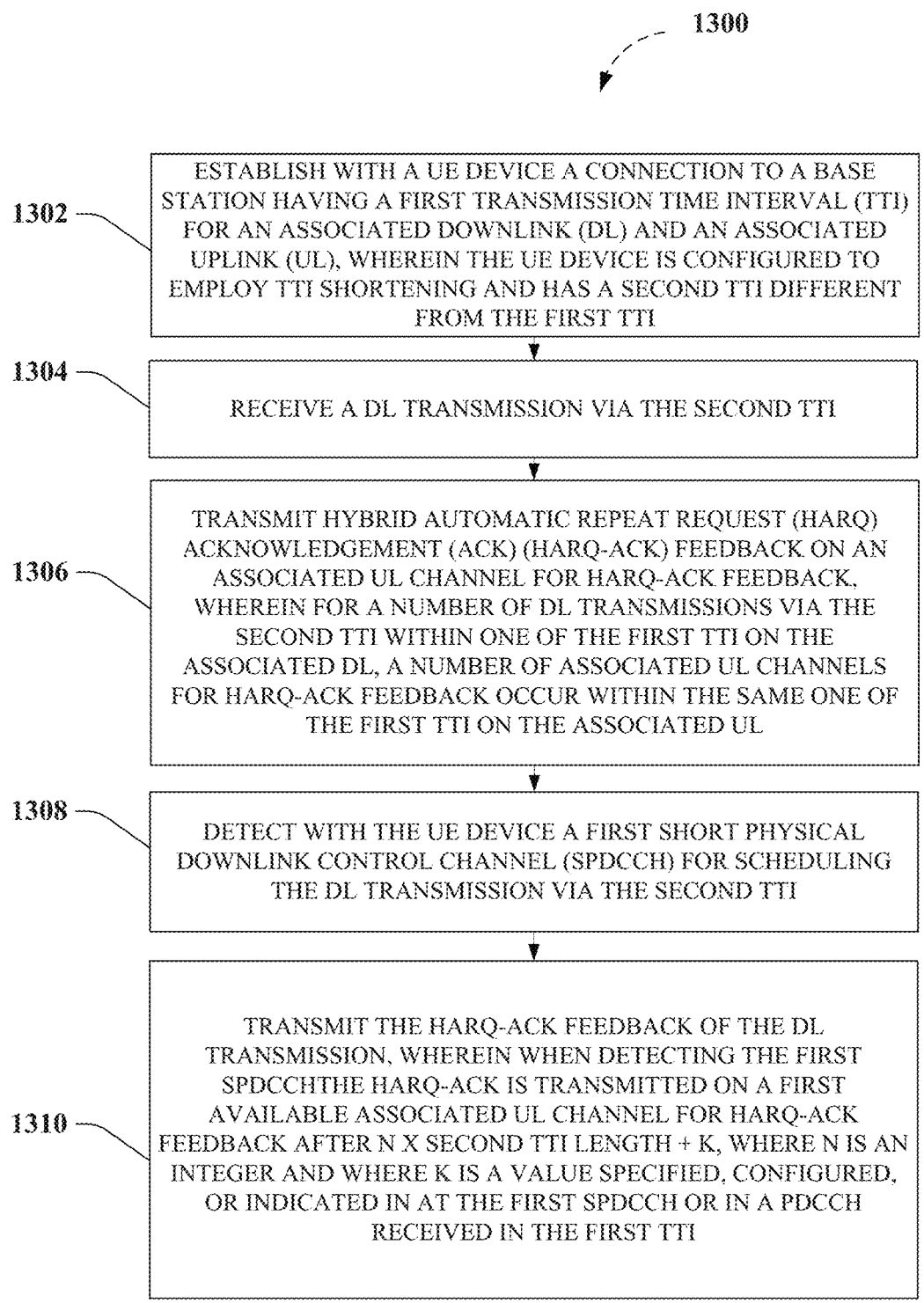
FIG. 13 illustrates another exemplary non-limiting flow diagram of methods for performing further non-limiting aspects of embodiments of the disclosed subject matter.
Figure 14:
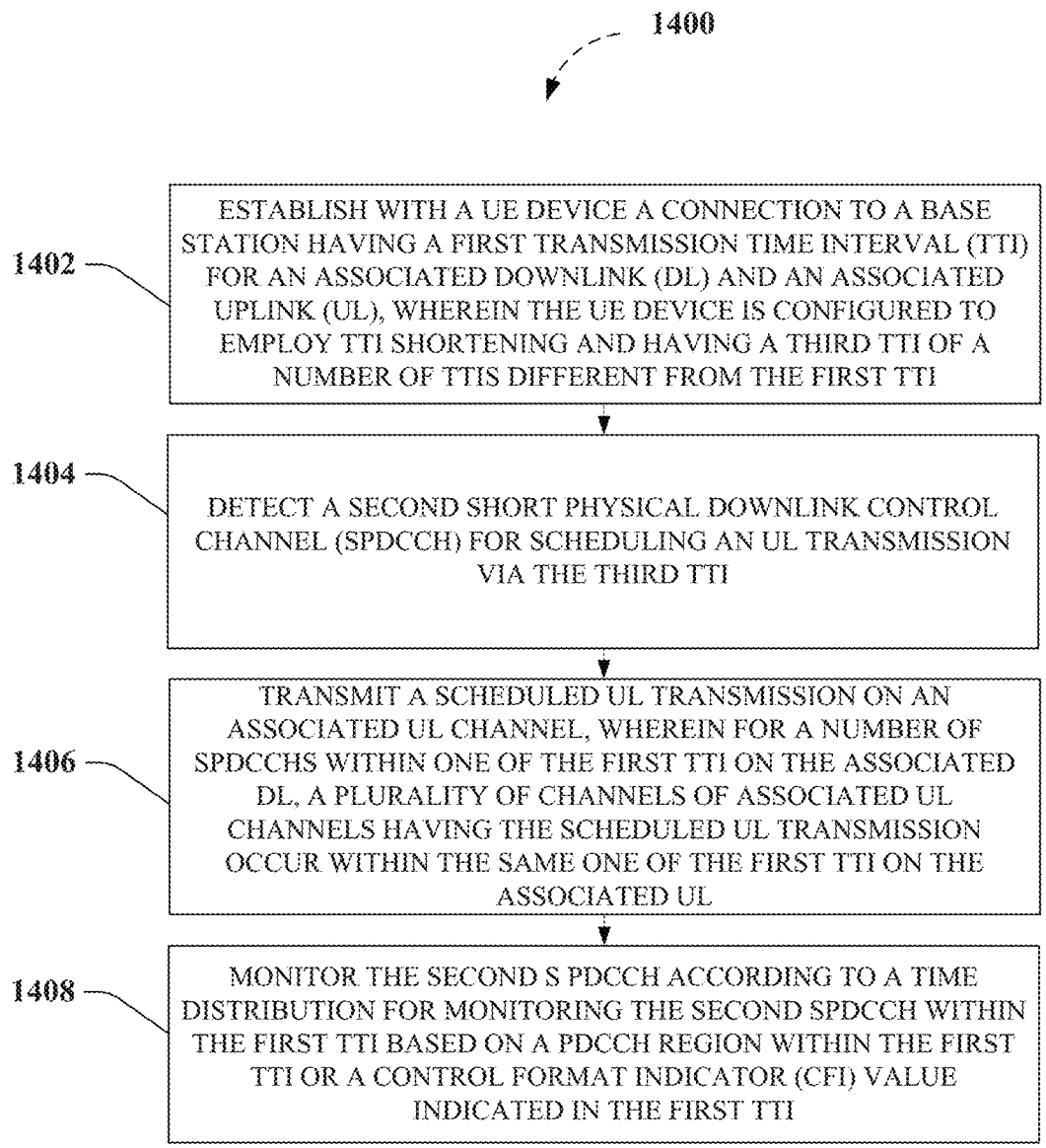
FIG. 14 illustrates yet another exemplary non-limiting flow diagram of methods for performing still other non-limiting aspects of embodiments of the disclosed subject matter.

In view of the example embodiments described, methods that can be implemented in accordance with the disclosed subject matter will be better appreciated with reference to the flowcharts of FIGS. 12-14, for example. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be understood that various other branches, flow paths, and orders of the blocks, can be implemented which achieve the same or a similar result. Moreover, not all illustrated blocks may be required to implement the methods described hereinafter. Additionally, it should be further understood that the methods and/or functionality disclosed hereinafter and throughout this specification are capable of being stored on an article of manufacture to facilitate transporting and transferring such methods to computers, for example, as further described herein. The terms computer readable medium, article of manufacture, and the like, as used herein, are intended to encompass a computer program accessible from any computer-readable device or media such as a tangible computer readable storage medium.

FIG. 12 illustrates an example non-limiting flow diagram of methods 1200 for performing aspects of embodiments of the disclosed subject matter. For instance, referring to FIG. 12, methods 1200 for TTI shortening can comprise, at 1202, establishing with the UE device (e.g., UE device configured to employ short TTI and comprising AT 116, AT 122, receiver system 204, or portions thereof, and/or as further described herein regarding FIGS. 12-18, etc.) a connection to a base station (e.g., a base station such as an access network 102, a transmitter system 202, and/or portions thereof, configured for TTI shortening, etc.) having a first TTI, wherein the UE device (e.g., UE device configured to employ short TTI and comprising AT 116, AT 122, receiver system 204, or portions thereof, and/or as further described herein regarding FIGS. 12-18, etc.) is configured to employ TTI shortening and has a second TTI (e.g., sTTI 304, etc.) different from the first TTI, as described herein. As a non-limiting example, exemplary methods 1200 can comprise establishing the connection to the base station having the first TTI comprising a subframe (e.g., subframe 306). In a further non-limiting example, exemplary methods 1200 can comprise establishing the connection to the base station, wherein the UE device (e.g., UE device configured to employ short TTI and comprising AT 116, AT 122, receiver system 204, or portions thereof, and/or as further described herein regarding FIGS. 12-18, etc.) has the second TTI (e.g., sTTI 304, etc.) comprising one or more of a one symbol, a two symbol, a three symbol, a four symbol, or a seven symbol duration (e.g., sTTI 304, etc.).

In addition, as described above, methods 1200 can further comprise, at 1204, monitoring a first short PDCCH region (e.g., a region comprising first sPDCCH 406, etc.) for a scheduled downlink (DL) transmission via the second TTI (e.g., sTTI 304, etc.), wherein a time distribution associated with multiple second TTIs (e.g., sTIIs 304, etc.) within the first TTI is determined based on a CFI value indicated via the first TTI, as further described herein. As a non-limiting example, exemplary methods 1200 can comprise monitoring the first short PDCCH region (e.g., a region comprising first sPDCCH 406, etc.) via the second TTI (e.g., sTTI 304, etc.), wherein the time distribution associated with the multiple second TTIs (e.g., sTTIs 304, etc.) within the first TTI is based on one or more of a symbol size of a PDCCH region within the first TTI, a first PDCCH (e.g., first PDCCH 402, etc.) received in the first TTI, or the CFI value indicated in the first TTI. In another non-limiting example, exemplary methods 1200 can comprise monitoring the first short PDCCH region (e.g., a region comprising first sPDCCH 406, etc.) according to a time distribution for monitoring the first short PDCCH region (e.g., a region comprising first sPDCCH 406, etc.) within a first TTI based on one or more of the symbol size of the PDCCH region within the first TTI, the first PDCCH (e.g., first PDCCH 402, etc.) received in the first TTI, or the CFI value indicated in the first TTI.

In further non-limiting implementations, exemplary methods 1200 can comprise, at 1206, detecting a first short PDCCH (e.g., first sPDCCH 406, etc.). In still further non-limiting implementations, exemplary methods 1200 can comprise, at 1208, determining one or more of a number of symbols or a number of symbol occasions for the scheduled DL transmission via the second TTI (e.g., sTTI 304, etc.) based on the first short PDCCH (e.g., first sPDCCH 406, etc.).

FIG. 13 illustrates an example non-limiting flow diagram of methods 1300 for performing aspects of embodiments of the disclosed subject matter. For instance, referring to FIG. 13, methods 1300 for TTI shortening can comprise, at 1302, establishing with the UE device (e.g., UE device configured to employ short TTI and comprising AT 116, AT 122, receiver system 204, or portions thereof, and/or as further described herein regarding FIGS. 12-18, etc.) a connection to a base station (e.g., a base station such as an access network 102, a transmitter system 202, and/or portions thereof, configured for TTI shortening, etc.) having a first TTI for an associated DL and an associated UL, wherein the UE device (e.g., UE device configured to employ short TTI and comprising AT 116, AT 122, receiver system 204, or portions thereof, and/or as further described herein regarding FIGS. 12-18, etc.) is configured to employ TTI shortening and has a second TTI (e.g., sTTI 304, etc.) different from the first TTI, as further described herein. As a non-limiting example, exemplary methods 1300 can comprise establishing the connection to the base station having the first TTI comprising a subframe (e.g., subframe 306). In a further non-limiting example, exemplary methods 1300 can comprise establishing the connection to the base station, wherein the UE device (e.g., UE device configured to employ short TTI and comprising AT 116, AT 122, receiver system 204, or portions thereof, and/or as further described herein regarding FIGS. 12-18, etc.) has the second TTI (e.g., sTTI 304, etc.) comprising one or more of a one symbol, a two symbol, a three symbol, a four symbol, or a seven symbol duration (e.g., sTTI 304, etc.), for example, as further described above.

In addition, as described above, methods 1300 can further comprise, at 1304, receiving a DL transmission via the second TTI (e.g., sTTI 304, etc.), in further non-limiting aspects. In further non-limiting implementations, exemplary methods 1300 can comprise, at 1306, transmitting hybrid automatic repeat request (HARD) acknowledgement (ACK) (HARQ-ACK) feedback on an associated UL channel for HARQ-ACK feedback, wherein for a number of DL transmissions via the second TTI (e.g., sTTI 304, etc.) within one of the first TTI on the associated DL, a number of associated UL channels for HARQ-ACK feedback occur within the same one of the first TTI on the associated UL, as further described herein. More specifically, for all of DL transmissions via the second TTI with one of the first TTI on the associated DL, all associated UL channels of the associated UL for HARQ-ACK feedback occur within the same one of the first TTI on the associated UL. As a non-limiting example, exemplary methods 1300 can comprise transmitting the HARQ-ACK feedback with subframe (e.g., subframe 306) association for the associated UL for short PDSCH transmissions in different shortened TTIs within one DL subframe (e.g., subframe 306), as further described herein. In a further non-limiting example, exemplary methods 1300 can comprise transmitting the HARQ-ACK feedback, wherein when detecting the first short PDCCH, the HARQ-ACK is transmitted on the associated UL channel for HARQ-ACK feedback with a first time offset of the first available associated UL channel for HARQ-ACK feedback after N×second TTI (e.g., sTTI 304, etc.) length, where N is an integer, and wherein for the number of DL transmissions via the second TTI within one of the first TTI on the associated DL, a first time offset induces same association on the one of the first TTI on the associated UL, in still further non-limiting aspects.

In still further non-limiting implementations, exemplary methods 1300 can comprise, at 1308, detecting with the UE device (e.g., UE device configured to employ short TTI and comprising AT 116, AT 122, receiver system 204, or portions thereof, and/or as further described herein regarding FIGS. 12-18, etc.) a first short PDCCH (e.g., first sPDCCH 406, etc.) for scheduling the DL transmission via the second TTI (e.g., sTTI 304, etc.), in further non-limiting aspects.

In addition, exemplary method 1300 can comprise, at 1310, transmitting the HARQ-ACK feedback of the at least the DL transmission, wherein when detecting the first short PDCCH, the HARQ-ACK is transmitted on a first available associated UL channel for HARQ-ACK feedback after N×second TTI (e.g., sTTI 304, etc.) length+k, where N is an integer and where k is a value specified, configured, or indicated in the first sPDCCH or in a PDCCH received in the first TTI to induce subframe (e.g., subframe 306) association for the associated UL for sPDSCH (e.g., sPDCCH 406, sPDCCH 902, etc.) transmissions in different shortened TTIs within one DL subframe (e.g., subframe 306) or to balance sPUCCH resource utilization, in still further non-limiting aspects. For a number of DL transmissions via the second TTI within one of the first TTI on the associated DL, k induces same association on one of the first TTI on the associated UL, according to further non-limiting aspects. More specifically, for all of DL transmissions via the second TTI within one of the first TTI on the associated DL, k induces same association on one of the first TTI on the associated UL, according to further non-limiting aspects.

FIG. 14 illustrates an example non-limiting flow diagram of methods 1400 for performing aspects of embodiments of the disclosed subject matter. For instance, referring to FIG. 14, methods 1400 for TTI shortening can comprise, at 1402, establishing with a UE device (e.g., UE device configured to employ short TTI and comprising AT 116, AT 122, receiver system 204, or portions thereof, and/or as further described herein regarding FIGS. 12-18, etc.) a connection to a base station (e.g., a base station such as an access network 102, a transmitter system 202, and/or portions thereof, configured for TTI shortening, etc.) having a first TTI for an associated DL and an associated UL, wherein the UE device (e.g., UE device configured to employ short TTI and comprising AT 116, AT 122, receiver system 204, or portions thereof, and/or as further described herein regarding FIGS. 12-18, etc.) is configured to employ TTI shortening and having a third TTI (e.g., sTTI 304, etc.) of a number of TTIs different from the first TTI, as further described herein. In a further non-limiting example, exemplary methods 1300 can comprise establishing the connection to the base station, wherein the UE device (e.g., UE device configured to employ short TTI and comprising AT 116, AT 122, receiver system 204, or portions thereof, and/or as further described herein regarding FIGS. 12-18, etc.) has the third TTI (e.g., sTTI 304, etc.) comprising one or more of a one symbol, a two symbol, a three symbol, a four symbol, or a seven symbol duration (e.g., sTTI 304, etc.), for example, as further described above.

In addition, as described above, methods 1400 can further comprise, at 1404, detecting a second sPDCCH (e.g., second short PDCCH 902, etc.) for scheduling an UL transmission via the third TTI (e.g., sTTI 304, etc.), in a further non-limiting aspect.

In further non-limiting implementations, exemplary methods 1400 can comprise, at 1406, transmitting one or more scheduled UL transmission on one or more associated UL channel, wherein for a number of short PDCCHs within one of the first TTI on the associated DL, a plurality of associated UL channels having the one or more scheduled UL transmission occur within the same one of the first TTI on the associated UL, in still further non-limiting aspects. More specifically, for all of short PDCCHs within one of the first TTI on the associated DL, all of associated UL channels having the one or more scheduled UL transmission occur within the same one of the first TTI on the associated UL. As a non-limiting example, exemplary methods 1400 can comprise transmitting the one or more scheduled UL transmission on the associated UL channel for scheduled UL transmission with a second time offset of another of a first available channel of the associated UL channel for scheduled UL transmission after $N' \times TTI_{UL}$, and wherein, for a number of short PDCCHs within one of the first TTI on the associated DL, the second time offset induces same association on one of the first TTI on the associated UL for a plurality of associated UL channels scheduled via the number of short PDCCHs. More specifically, for all of short PDCCHs within one of the first TTI on the associated DL, the second time offset induces same association on one of the first TTI on the associated UL for all of associated UL channels scheduled via the number of short PDCCHs. In addition, in a further non-limiting example, exemplary methods 1400 can comprise transmitting the one or more scheduled UL transmission on a first available associated UL channel for scheduled UL transmission after $N' \times TTI_{UL} + k'$, where N' is the integer, $TTI_{UL}$ is the length of the third TTI or an interval between symbols of a monitored second sPDCCH, and where k' is specified, configured, or indicated in the second sPDCCH, wherein for a number of sPDCCHs within the one of the first TTI on the associated DL, k' induces same association on the one of the first TTI on the associated UL for the plurality of associated UL channels scheduled via the number of sPDCCHs. More specifically, for all of sPDCCHs within the one of the first TTI on the associated DL, k' induces same association on the one of the first TTI on the associated UL for all of associated UL channels scheduled via the all of sPDCCHs.

In still further non-limiting implementations, exemplary methods 1400 can comprise, at 1408, monitoring the second short PDCCH (e.g., second short PDCCH 902, etc.) according to a time distribution for monitoring the second short PDCCH (e.g., second short PDCCH 902, etc.) within the first TTI based on one or more of a PDCCH region (e.g., PDCCH region 308, etc.) within the first TTI or a CFI value indicated in the first TTI. As a non-limiting example, exemplary methods 1400 can comprise monitoring the second short PDCCH (e.g., second short PDCCH 902, etc.), according to the time distribution for monitoring the second short PDCCH (e.g., second short PDCCH 902, etc.) within the first TTI based on a subset of all symbols in the first TTI except the PDCCH region (e.g., PDCCH region 308) within the first TTI, in still further non-limiting aspects.

In view of the example embodiments described supra, devices and systems that can be implemented in accordance with the disclosed subject matter will be better appreciated with reference to the diagrams of FIGS. 15-18. While for purposes of simplicity of explanation, the example devices and systems are shown and described as a collection of blocks, it is to be understood and appreciated that the claimed subject matter is not limited by the order, arrangement, and/or number of the blocks, as some blocks may occur in different orders, arrangements, and/or combined and/or distributed with other blocks or functionality associated therewith from what is depicted and described herein. Moreover, not all illustrated blocks may be required to implement the example devices and systems described hereinafter. Additionally, it should be further understood that the example devices and systems and/or functionality disclosed hereinafter and throughout this specification are capable of being stored on an article of manufacture to facilitate transporting and transferring such methods to computers, for example, as further described herein. The terms computer readable medium, article of manufacture, and the like, as used herein, are intended to encompass a computer program product accessible from any computer-readable device or media such as a tangible computer readable storage medium.

It can be understood that various techniques described herein may be implemented in connection with hardware or software or, where appropriate, with a combination of both. As used herein, the terms "device," "component," "system" and the like are likewise intended to refer to a computer-related entity, either hardware, a combination of hardware and software, software, or software in execution. For example, a "device," "component," subcomponent, "system" portions thereof, and so on, may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

It can be further understood that while a brief overview of example systems, methods, scenarios, and/or devices has been provided, the disclosed subject matter is not so limited. Thus, it can be further understood that various modifications, alterations, addition, and/or deletions can be made without departing from the scope of the embodiments as described herein. Accordingly, similar non-limiting implementations can be used or modifications and additions can be made to the described embodiments for performing the same or equivalent function of the corresponding embodiments without deviating therefrom.

Figure 15:
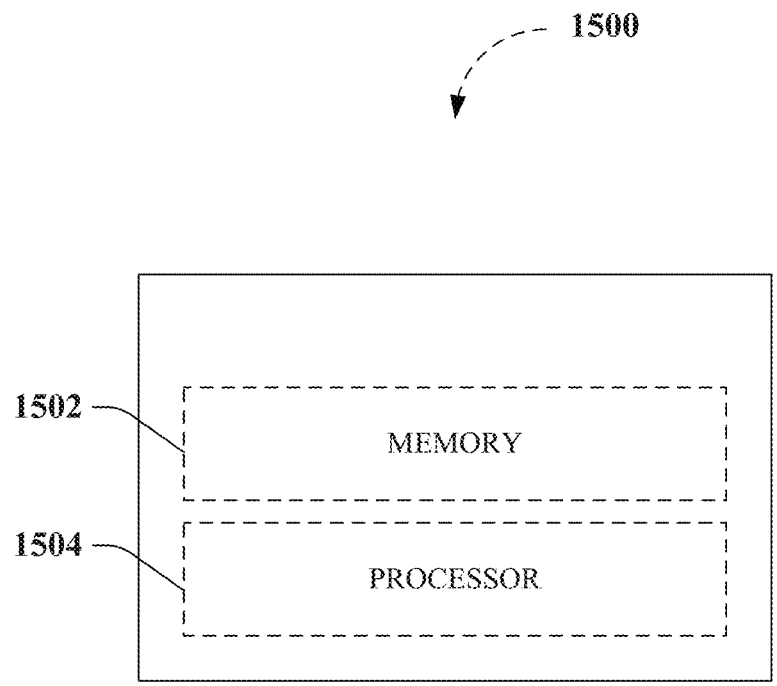
FIG. 15 depicts an exemplary non-limiting device or system suitable for performing various aspects of the disclosed subject matter.

FIG. 15 illustrates an example non-limiting device or system 1500 suitable for performing various aspects of the disclosed subject matter. The device or system 1500 can be a stand-alone device or a portion thereof, a specially programmed computing device or a portion thereof (e.g., a memory retaining instructions for performing the techniques as described herein coupled to a processor), and/or a composite device or system comprising one or more cooperating components distributed among several devices, as further described herein. As an example, example non-limiting device or system 1500 can comprise example devices and/or systems regarding FIGS. 1-14, as described above, or as further described below regarding FIGS. 16-18, for example, or portions thereof. For example, FIG. 15 depicts an example device 1500, such as a UE device (e.g., UE device configured to employ short TTI and comprising AT 116, AT 122, receiver system 204, or portions thereof, and/or as further described herein regarding FIGS. 12-18, etc.). In another non-limiting example, FIG. 15 depicts an example device 1500, such as a base station (e.g., a base station such as an access network 102, a transmitter system 202, and/or portions thereof, configured for TTI shortening, etc.), according to control channel structures and/or TTI shortening methods as described herein.

Accordingly, device or system 1500 can comprise a memory 1502 that retains various instructions with respect to facilitating various operations, for example, such as: establishing with the UE device (e.g., UE device configured to employ short TTI and comprising AT 116, AT 122, receiver system 204, or portions thereof, and/or as further described herein regarding FIGS. 12-18, etc.) a connection to a base station (e.g., a base station such as an access network 102, a transmitter system 202, and/or portions thereof, configured for TTI shortening, etc.) having a first TTI, wherein the UE device (e.g., UE device configured to employ short TTI and comprising AT 116, AT 122, receiver system 204, or portions thereof, and/or as further described herein regarding FIGS. 12-18, etc.) is configured to employ TTI shortening and has a second TTI (e.g., sTTI 304, etc.) (or third TTI and so on) different from the first TTI; monitoring a first short PDCCH region (e.g., a region comprising first sPDCCH 406, etc.) for a scheduled downlink (DL) transmission via the second TTI (e.g., sTTI 304, etc.), wherein a time distribution associated with multiple second TTIs (e.g., sTIIs 304, etc.) within the first TTI is determined based on a CFI value indicated via the first TTI; detecting a first short PDCCH (e.g., first sPDCCH 406, etc.); determining one or more of a number of symbols or a number of symbol occasions for the scheduled DL transmission via the second TTI (e.g., sTTI 304, etc.) based on the first short PDCCH (e.g., first sPDCCH 406, etc.); encryption; decryption; providing various user or device interfaces; and/or communications routines such as networking, and/or peer-to-peer communications routines, and/or the like.

For instance, device or system 1500 can comprise a memory 1502 that retains instructions for establishing the connection to the base station having the first TTI comprising a subframe (e.g., subframe 306), for establishing the connection to the base station, wherein the UE device (e.g., UE device configured to employ short TTI and comprising AT 116, AT 122, receiver system 204, or portions thereof, and/or as further described herein regarding FIGS. 12-18, etc.) has the second TTI (e.g., sTTI 304, etc.) comprising one or more of a one symbol, a two symbol, a three symbol, a four symbol, or a seven symbol duration (e.g., sTTI 304, etc.), and so on, as further described above regarding FIGS. 12-14, for example.

Additionally, memory 1502 can retain instructions for receiving a DL transmission via the second TTI (e.g., sTTI 304, etc.); transmitting hybrid automatic repeat request (HARD) acknowledgement (ACK) (HARQ-ACK) feedback on an associated UL channel for HARQ-ACK feedback, wherein for a number of DL transmissions via the second TTI (e.g., sTTI 304, etc.) within one of the first TTI on the associated DL, a number of channels of the associated UL for HARQ-ACK feedback occur within the same one of the first TTI on the associated UL; detecting with the UE device (e.g., UE device configured to employ short TTI and comprising AT 116, AT 122, receiver system 204, or portions thereof, and/or as further described herein regarding FIGS. 12-18, etc.) a first short PDCCH (e.g., first sPDCCH 406, etc.) for scheduling the DL transmission via the second TTI (e.g., sTTI 304, etc.); transmitting the HARQ-ACK feedback of the at least the DL transmission, wherein when detecting the first sPDCCH, the HARQ-ACK is transmitted on a first associated UL channel for HARQ-ACK feedback after N×second TTI (e.g., sTTI 304, etc.) length+k, where N is an integer and where k is a value specified, configured, or indicated in the first sPDCCH or in a PDCCH received in the first TTI; encryption; decryption; providing various user or device interfaces; and/or communications routines such as networking, and/or peer-to-peer communications routines, and/or the like, for example, as further described above regarding FIG. 13.

Additionally, memory 1502 can retain instructions for establishing with the UE device (e.g., UE device configured to employ short TTI and comprising AT 116, AT 122, receiver system 204, or portions thereof, and/or as further described herein regarding FIGS. 12-18, etc.) a connection to a base station (e.g., a base station such as an access network 102, a transmitter system 202, and/or portions thereof, configured for TTI shortening, etc.) having a first TTI for an associated DL and an associated UL, wherein the UE device (e.g., UE device configured to employ short TTI and comprising AT 116, AT 122, receiver system 204, or portions thereof, and/or as further described herein regarding FIGS. 12-18, etc.) is configured to employ TTI shortening and having a third TTI (e.g., sTTI 304, etc.) of a number of TTIs different from the first TTI; detecting a second sPDCCH (e.g., second short PDCCH 902, etc.) for scheduling an UL transmission via the third TTI (e.g., sTTI 304, etc.); transmitting the one or more scheduled UL transmission on one or more associated UL, wherein for a number of short PDCCHs received within one of the first TTI on the associated DL, a plurality of associated UL channels having the one or more scheduled UL transmission occur within the same one of the first TTI on the associated UL; monitoring the second short PDCCH (e.g., second short PDCCH 902, etc.) according to a time distribution for monitoring the second short PDCCH (e.g., second short PDCCH 902, etc.) within the first TTI based on one or more of a PDCCH region within the first TTI or a CFI value indicated in the first TTI; encryption; decryption; providing various user interfaces; and/or communications routines such as networking, and/or the like, for example, as further described above regarding FIG. 14.

The above example instructions and other suitable instructions for functionalities as described herein, alternatives for, and/or modifications thereof for example, regarding FIGS. 1-14 and 16-18, etc., can be retained within memory 1502, and a processor 1504 can be utilized in connection with executing the instructions.

One or more embodiments as described herein can comprise a computer program product directed to a tangible computer readable storage medium comprising computer-executable instructions, for example, as described above regarding FIGS. 1-15, etc., that, in response to execution by a processor, can cause a computing device including a processor, for example, such as a UE device (e.g., UE device configured to employ short TTI and comprising AT 116, AT 122, receiver system 204, or portions thereof, and/or as further described herein regarding FIGS. 12-18, etc.), a base station (e.g., a base station such as an access network 102, a transmitter system 202, and/or portions thereof, configured for TTI shortening, etc.), etc., to perform operations according to the computer-executable instructions on the tangible computer readable storage medium, for example, as further described herein.

Figure 16:
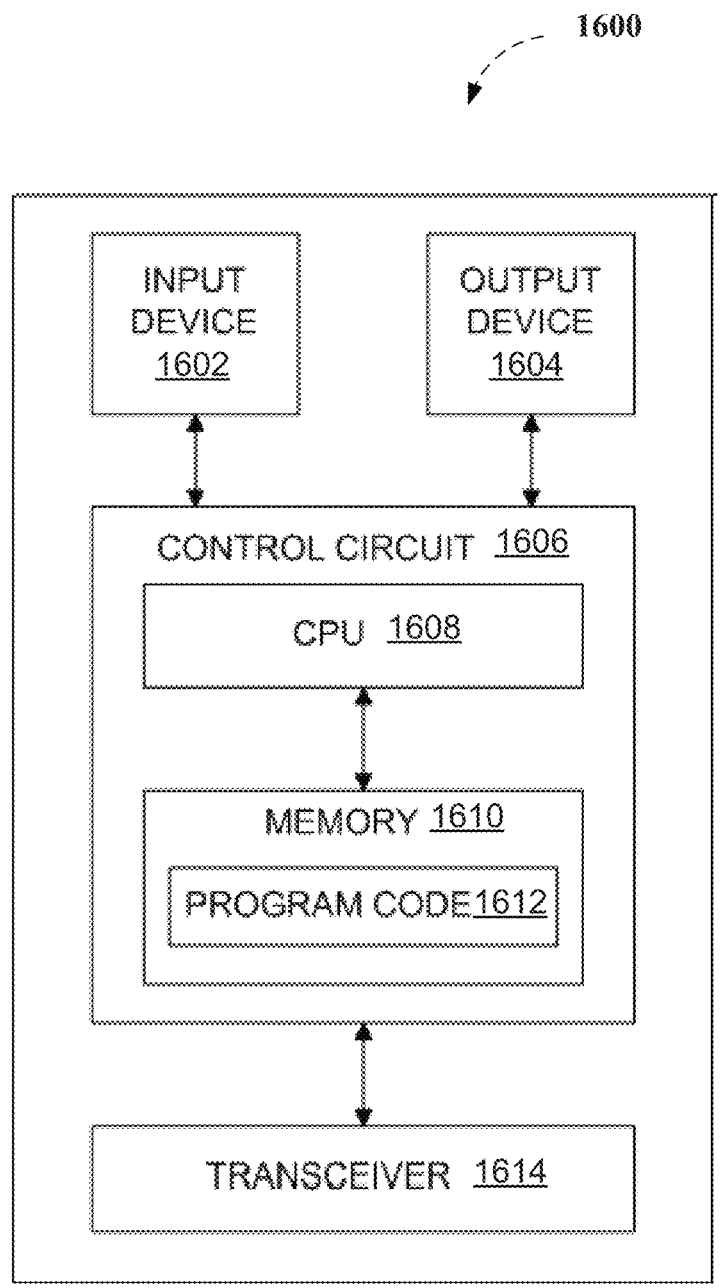
FIG. 16 depicts a simplified functional block diagram of an exemplary non-limiting communication device suitable for incorporation of various aspects of the subject disclosure.

FIG. 16 depicts a simplified functional block diagram of an exemplary non-limiting communication device 1600, such as a UE device (e.g., UE device configured to employ short TTI and comprising AT 116, AT 122, receiver system 204, or portions thereof, and/or as further described herein regarding FIGS. 12-18, etc.), a base station (e.g., a base station such as an access network 102, a transmitter system 202, and/or portions thereof, configured for TTI shortening, etc.), etc., suitable for incorporation of various aspects of the subject disclosure. As shown in FIG. 16, exemplary communication device 1600 in a wireless communication system can be utilized for realizing the UEs (or ATs) 116 and 122 in FIG. 1, for example, and the wireless communications system such as described above regarding FIG. 1, as a further example, can be the LTE system, the NR system, etc. Exemplary communication device 1600 can comprise an input device 1602, an output device 1604, a control circuit 1606, a central processing unit (CPU) 1608, a memory 1610, a program code 1612, and a transceiver 1614. Exemplary control circuit 1606 can execute the program code 1612 in the memory 1610 through the CPU 1608, thereby controlling an operation of the communications device 1600. Exemplary communications device 1600 can receive signals input by a user through the input device 1602, such as a keyboard or keypad, and can output images and sounds through the output device 1604, such as a monitor or speaker. Exemplary transceiver 1614 can be used to receive and transmit wireless signals, delivering received signals to the control circuit 1606, and outputting signals generated by the control circuit 1606 wirelessly, for example, as described above regarding FIG. 1.

Accordingly, further non-limiting embodiments as described herein can comprise a UE device (e.g., UE device configured to employ short TTI and comprising AT 116, AT 122, receiver system 204, or portions thereof, and/or as further described herein regarding FIGS. 12-18, etc.) that can comprise one or more of a exemplary control circuit 1606, a processor (e.g., CPU 1608, etc.) installed in the control circuit (e.g., control circuit 1606), a memory (e.g., memory 1610) installed in the control circuit (e.g., control circuit 1606) and coupled to the processor (e.g., CPU 1608, etc.), wherein the processor (e.g., CPU 1608, etc.) is configured to execute a program code (e.g., program code 1612) stored in the memory (e.g., memory 1610) to perform method steps and/or provide functionality as described herein. As a non-limiting example, exemplary program code (e.g., program code 1612) can comprise computer-executable instructions as described above regarding FIG. 15, portions thereof, and/or complementary or supplementary instructions thereto, in addition to computer-executable instructions configured to achieve functionalities as described herein, regarding FIGS. 1-14, and/or any combinations thereof.

Figure 17:
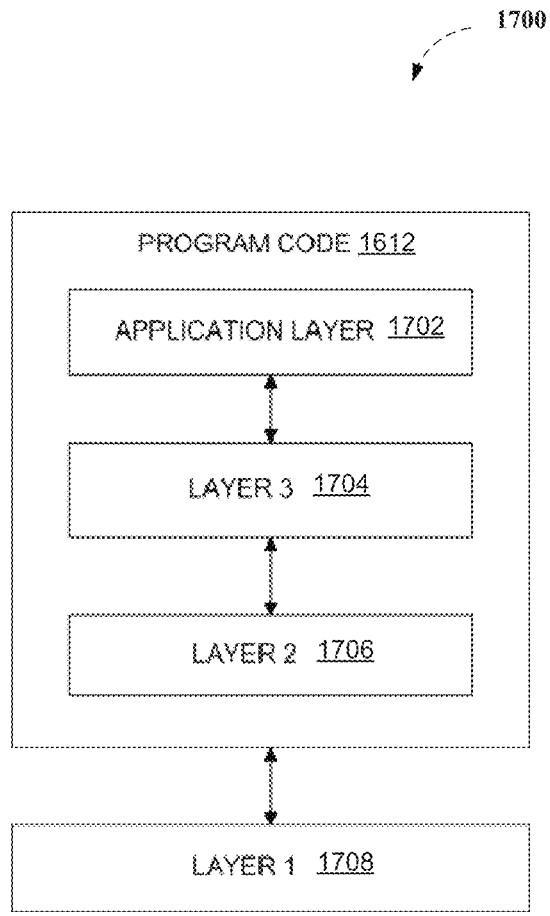
FIG. 17 depicts a simplified block diagram of exemplary program code shown in FIG. 12, suitable for incorporation of various aspects of the subject disclosure.

FIG. 17 depicts a simplified block diagram 1700 of exemplary program code 1612 shown in FIG. 16, suitable for incorporation of various aspects of the subject disclosure. In this embodiment, exemplary program code 1612 can comprise an application layer 1702, a Layer 3 portion 1704, and a Layer 2 portion 1706, and can be coupled to a Layer 1 portion 1708. The Layer 3 portion 1704 generally performs radio resource control. The Layer 2 portion 1706 generally performs link control. The Layer 1 portion 1708 generally performs physical connections. For LTE, LTE-A, or NR system, the Layer 2 portion 1706 may include a Radio Link Control (RLC) layer and a Medium Access Control (MAC) layer. The Layer 3 portion 1704 may include a Radio Resource Control (RRC) layer. In addition, as further described above, exemplary program code (e.g., program code 1612) can comprise computer-executable instructions as described above regarding FIG. 15, portions thereof, and/or complementary or supplementary instructions thereto, in addition to computer-executable instructions configured to achieve functionalities as described herein, regarding FIGS. 1-14, and/or any combinations thereof.

Figure 18:
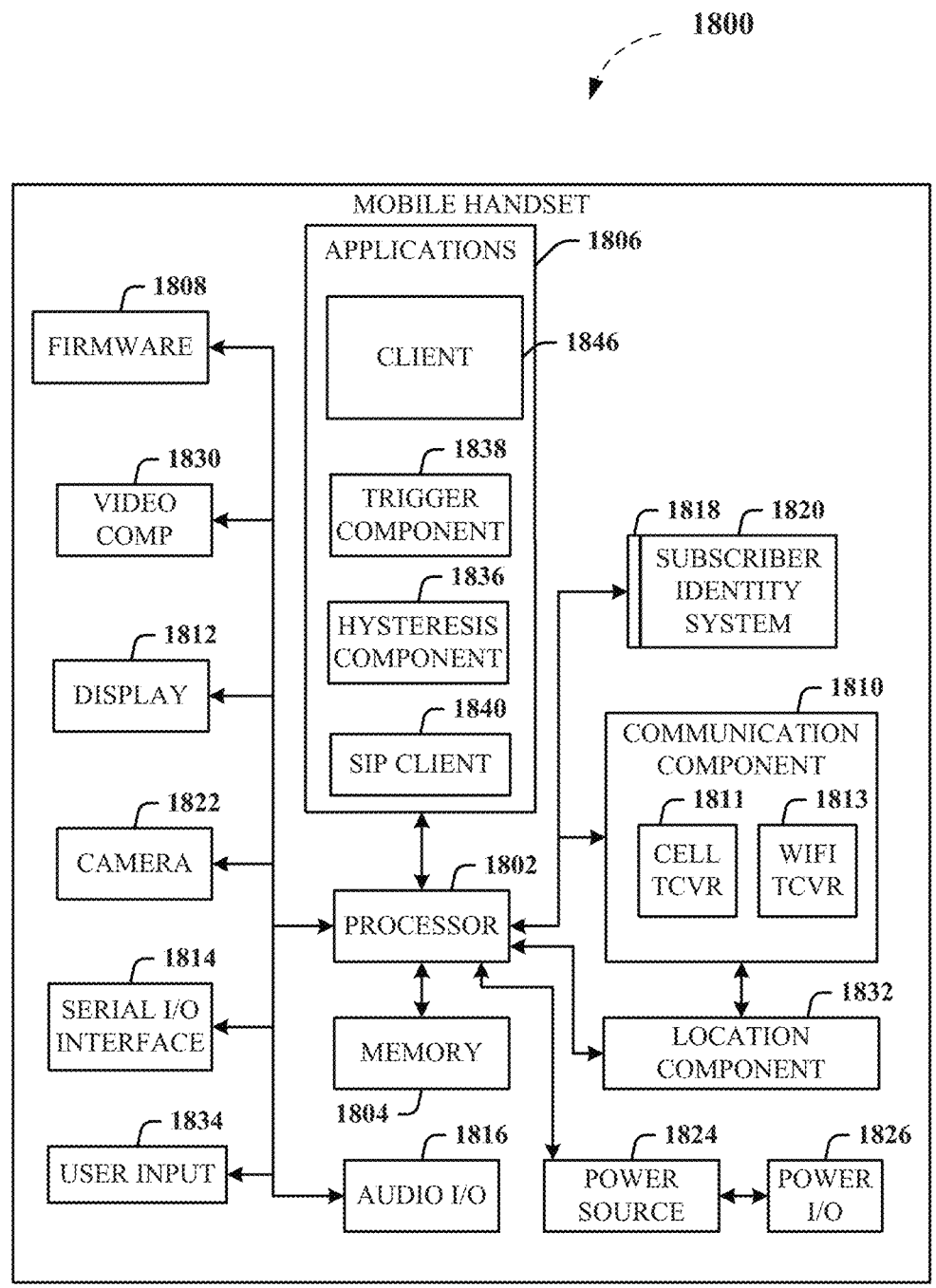
FIG. 18 illustrates a schematic diagram of an example mobile device (e.g., a mobile handset, user device, user equipment, or access terminal) that can facilitate various non-limiting aspects of the disclosed subject matter in accordance with the embodiments described herein.

FIG. 18 depicts a schematic diagram of an example mobile device 1800 (e.g., a mobile handset, UE, AT, etc.) that can facilitate various non-limiting aspects of the disclosed subject matter in accordance with the embodiments described herein. Although mobile handset 1800 is illustrated herein, it will be understood that other devices can be any of a number of other a mobile devices, for instance, and that the mobile handset 1800 is merely illustrated to provide context for the embodiments of the subject matter described herein. The following discussion is intended to provide a brief, general description of an example of a suitable environment 1800 in which the various embodiments can be implemented. While the description includes a general context of computer-executable instructions embodied on a tangible computer readable storage medium, those skilled in the art will recognize that the subject matter also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer readable media. Computer readable media can comprise any available media that can be accessed by the computer and includes both volatile and non-volatile media, removable and non-removable media. By way of example and not limitation, computer readable media can comprise tangible computer readable storage and/or communication media. Tangible computer readable storage can include volatile and/or non-volatile media, removable and/or non-removable media implemented in any method or technology for storage of information, such as computer readable instructions, data structures, program modules, or other data. Tangible computer readable storage can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media, as contrasted with tangible computer readable storage, typically embodies computer readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal, for example, as further described herein. By way of example, and not limitation, communication media includes wired media such as a wired network or direct-wired connection, and wireless media such as acoustic, RF, infrared and other wireless media. Combinations of the any of the above should also be included within the scope of computer readable communications media as distinguishable from computer-readable storage media.

The handset 1800 can include a processor 1802 for controlling and processing all onboard operations and functions. A memory 1804 interfaces to the processor 1802 for storage of data and one or more applications 1806 (e.g., communications applications such as browsers, apps, etc.). Other applications can support operation of communications and/or financial communications protocols. The applications 1806 can be stored in the memory 1804 and/or in a firmware 1808, and executed by the processor 1802 from either or both the memory 1804 or/and the firmware 1808. The firmware 1808 can also store startup code for execution in initializing the handset 1800. A communications component 1810 interfaces to the processor 1802 to facilitate wired/wireless communication with external systems, e.g., cellular networks, VoIP networks, and so on. Here, the communications component 1810 can also include a suitable cellular transceiver 1811 (e.g., a GSM transceiver, a CDMA transceiver, an LTE transceiver, etc.) and/or an unlicensed transceiver 1813 (e.g., Wireless Fidelity (WiFi™), Worldwide Interoperability for Microwave Access (WiMax®)) for corresponding signal communications, and the like. The handset 1800 can be a device such as a cellular telephone, a personal digital assistant (PDA) with mobile communications capabilities, and messaging-centric devices. The communications component 1810 also facilitates communications reception from terrestrial radio networks (e.g., broadcast), digital satellite radio networks, and Internet-based radio services networks, and so on.

The handset 1800 includes a display 1812 for displaying text, images, video, telephony functions (e.g., a Caller ID function, etc.), setup functions, and for user input. For example, the display 1812 can also be referred to as a "screen" that can accommodate the presentation of multimedia content (e.g., music metadata, messages, wallpaper, graphics, etc.). The display 1812 can also display videos and can facilitate the generation, editing and sharing of video quotes. A serial I/O interface 1814 is provided in communication with the processor 1802 to facilitate wired and/or wireless serial communications (e.g., Universal Serial Bus (USB), and/or Institute of Electrical and Electronics Engineers (IEEE) 1494) through a hardwire connection, and other serial input devices (e.g., a keyboard, keypad, and mouse). This supports updating and troubleshooting the handset 1800, for example. Audio capabilities are provided with an audio I/O component 1816, which can include a speaker for the output of audio signals related to, for example, indication that the user pressed the proper key or key combination to initiate the user feedback signal. The audio I/O component 1816 also facilitates the input of audio signals through a microphone to record data and/or telephony voice data, and for inputting voice signals for telephone conversations.

The handset 1800 can include a slot interface 1818 for accommodating a SIC (Subscriber Identity Component) in the form factor of a card Subscriber Identity Module (SIM) or universal SIM 1820, and interfacing the SIM card 1820 with the processor 1802. However, it is to be appreciated that the SIM card 1820 can be manufactured into the handset 1800, and updated by downloading data and software.

The handset 1800 can process Internet Protocol (IP) data traffic through the communication component 1810 to accommodate IP traffic from an IP network such as, for example, the Internet, a corporate intranet, a home network, a person area network, a cellular network, etc., through an internet service provider (ISP) or broadband cable provider. Thus, VoIP traffic can be utilized by the handset 1800 and IP-based multimedia content can be received in either an encoded or a decoded format.

A video processing component 1822 (e.g., a camera and/or associated hardware, software, etc.) can be provided for decoding encoded multimedia content. The video processing component 1822 can aid in facilitating the generation and/or sharing of video. The handset 1800 also includes a power source 1824 in the form of batteries and/or an alternating current (AC) power subsystem, which power source 1824 can interface to an external power system or charging equipment (not shown) by a power input/output (I/O) component 1826.

The handset 1800 can also include a video component 1830 for processing video content received and, for recording and transmitting video content. For example, the video component 1830 can facilitate the generation, editing and sharing of video. A location-tracking component 1832 facilitates geographically locating the handset 1800. A user input component 1834 facilitates the user inputting data and/or making selections as previously described. The user input component 1834 can also facilitate selecting perspective recipients for fund transfer, entering amounts requested to be transferred, indicating account restrictions and/or limitations, as well as composing messages and other user input tasks as required by the context. The user input component 1834 can include such conventional input device technologies such as a keypad, keyboard, mouse, stylus pen, and/or touch screen, for example.

Referring again to the applications 1806, a hysteresis component 1836 facilitates the analysis and processing of hysteresis data, which is utilized to determine when to associate with an access point. A software trigger component 1838 can be provided that facilitates triggering of the hysteresis component 1838 when a WiFi™ transceiver 1813 detects the beacon of the access point. A Session Initiation Protocol (SIP) client 1840 enables the handset 1800 to support SIP protocols and register the subscriber with the SIP registrar server. The applications 1806 can also include a communications application or client 1846 that, among other possibilities, can facilitate user interface component functionality as described above.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code or program code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the various embodiments of the subject disclosure have been described in connection with various non-limiting aspects, it will be understood that the embodiments of the subject disclosure may be capable of further modifications. This application is intended to cover any variations, uses or adaptation of the subject disclosure following, in general, the principles of the subject disclosure, and including such departures from the present disclosure as come within the known and customary practice within the art to which the subject disclosure pertains.

Those skilled in the art will recognize that it is common within the art to describe devices and/or processes in the fashion set forth herein, and thereafter use engineering practices to integrate such described devices and/or processes into systems. That is, at least a portion of the devices and/or processes described herein can be integrated into a system via a reasonable amount of experimentation. Those having skill in the art will recognize that a typical system can include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control device (e.g., feedback for sensing position and/or velocity; control devices for moving and/or adjusting parameters). A typical system can be implemented utilizing any suitable commercially available components, such as those typically found in data computing/communication and/or network computing/communication systems.

Various embodiments of the disclosed subject matter sometimes illustrate different components contained within, or connected with, other components. It is to be understood that such depicted architectures are merely exemplary, and that, in fact, many other architectures can be implemented which achieve the same and/or equivalent functionality. In a conceptual sense, any arrangement of components to achieve the same and/or equivalent functionality is effectively "associated" such that the desired functionality is achieved. Hence, any two components herein combined to achieve a particular functionality can be seen as "associated with" each other such that the desired functionality is achieved, irrespective of architectures or intermediary components. Likewise, any two components so associated can also be viewed as being "operably connected," "operably coupled," "communicatively connected," and/or "communicatively coupled," to each other to achieve the desired functionality, and any two components capable of being so associated can also be viewed as being "operably couplable" or "communicatively couplable" to each other to achieve the desired functionality. Specific examples of operably couplable or communicatively couplable can include, but are not limited to, physically mateable and/or physically interacting components, wirelessly interactable and/or wirelessly interacting components, and/or logically interacting and/or logically interactable components.

With respect to substantially any plural and/or singular terms used herein, those having skill in the art can translate from the plural to the singular and/or from the singular to the plural as can be appropriate to the context and/or application. The various singular/plural permutations may be expressly set forth herein for the sake of clarity, without limitation.

It will be understood by those skilled in the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes, but is not limited to," etc.). It will be further understood by those skilled in the art that, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limit any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include, but not be limited to, systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those skilled in the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into sub-ranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be noted that various embodiments of the disclosed subject matter have been described herein for purposes of illustration, and that various modifications may be made without departing from the scope and spirit of the subject disclosure. Accordingly, the various embodiments disclosed herein are not intended to be limiting, with the true scope and spirit being indicated by the appended claims.

In addition, the words "example" and "non-limiting" are used herein to mean serving as an example, instance, or illustration. For the avoidance of doubt, the subject matter disclosed herein is not limited by such examples. Moreover, any aspect or design described herein as "an example," "an illustration," "example" and/or "non-limiting" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements, as described above.

As mentioned, the various techniques described herein can be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on computer and the computer can be a component. In addition, one or more components can reside within a process and/or thread of execution and a component can be localized on one computer and/or distributed between two or more computers.

Systems described herein can be described with respect to interaction between several components. It can be understood that such systems and components can include those components or specified sub-components, some of the specified components or sub-components, or portions thereof, and/or additional components, and various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and that any one or more middle component layers, such as a management layer, can be provided to communicatively couple to such sub-components in order to provide integrated functionality, as mentioned. Any components described herein can also interact with one or more other components not specifically described herein but generally known by those of skill in the art.

As mentioned, in view of the example systems described herein, methods that can be implemented in accordance with the described subject matter can be better appreciated with reference to the flowcharts of the various figures and vice versa. While for purposes of simplicity of explanation, the methods can be shown and described as a series of blocks, it is to be understood and appreciated that the claimed subject matter is not limited by the order of the blocks, as some blocks can occur in different orders and/or concurrently with other blocks from what is depicted and described herein. Where non-sequential, or branched, flow is illustrated via flowchart, it can be understood that various other branches, flow paths, and orders of the blocks, can be implemented which achieve the same or a similar result. Moreover, not all illustrated blocks can be required to implement the methods described hereinafter.

While the disclosed subject matter has been described in connection with the disclosed embodiments and the various figures, it is to be understood that other similar embodiments may be used or modifications and additions may be made to the described embodiments for performing the same function of the disclosed subject matter without deviating therefrom. Still further, multiple processing chips or multiple devices can share the performance of one or more functions described herein, and similarly, storage can be effected across a plurality of devices. In other instances, variations of process parameters (e.g., configuration, number of components, aggregation of components, process step timing and order, addition and/or deletion of process steps, addition of preprocessing and/or post-processing steps, etc.) can be made to further optimize the provided structures, devices and methods, as shown and described herein. In any event, the systems, structures and/or devices, as well as the associated methods described herein have many applications in various aspects of the disclosed subject matter, and so on. Accordingly, the subject disclosure should not be limited to any single embodiment, but rather should be construed in breadth, spirit and scope in accordance with the appended claims.

What is claimed is:

1. A method for a user equipment (UE) device comprising a processor and a memory, comprising:
    establishing a connection to a base station with a first transmission time interval (TTI) length;
    receiving a configuration of TTI shortening with a second TTI length different from the first TTI length;
    determining a short TTI (sTTI)/short physical downlink control channel (sPDCCH) pattern for a first TTI based at least in part on a control format indicator (CFI) value indicated in the first TTI,
    wherein the first TTI is with the first TTI length and comprises a plurality of short TTIs with the second TTI length in time domain,
    wherein the sTTI/sPDCCH pattern is associated with distribution of the plurality of the short TTIs within the first TTI,
    wherein the CFI value used to determine the sTTI/sPDCCH pattern indicates a number of orthogonal frequency division multiplexing (OFDM) symbols used for transmission of PDCCHs within the first TTI, and
    wherein the sTTI/sPDCCH pattern determined based at least in part on the CFI value is different than a second sTTI/sPDCCH pattern determined based at least in part on a second CFI value different than the CFI value, wherein the second CFI value indicates a second number of OFDM symbols used for transmission of PDCCHs different than the number of OFDM symbols indicated by the CFI value; and
    monitoring a first short physical downlink control channel (sPDCCH) region for a scheduled downlink (DL) transmission with the second TTI length, different from the first TTI length, based at least in part on the sTTI/sPDCCH pattern.

2. The method of claim 1, wherein the establishing the connection to the base station with the first TTI length comprises establishing the connection to the base station with the first TTI length comprising a subframe, and wherein the UE device has the second TTI length comprising at least one of a one symbol, a two symbol, a three symbol, a four symbol, or a seven symbol duration.

3. The method of claim 1, wherein the sTTI/sPDCCH pattern is determined based at least in part on at least one of a symbol size of a PDCCH region within the first TTI, a first PDCCH received in the first TTI, or the CFI value indicated in the first TTI.

4. The method of claim 3, wherein the monitoring the first sPDCCH region comprises monitoring the first sPDCCH region according to a time distribution for monitoring the first sPDCCH region within a first TTI based at least in part on at least one of the symbol size of the PDCCH region within the first TTI, the first PDCCH received in the first TTI, or the CFI value indicated in the first TTI.

5. The method of claim 3, further comprising:
    detecting a first sPDCCH; and
    determining at least one of a number of symbols or a number of symbol occasions for the scheduled DL transmission with the second TTI length based at least in part on the first sPDCCH.

6. The method of claim 1, further comprising:
    receiving a DL transmission with the second TTI length; and
    transmitting hybrid automatic repeat request (HARQ) acknowledgement (ACK) (HARQACK) feedback on an associated UL channel for HARQ-ACK feedback, wherein for a number of DL transmissions with the second TTI lengths within the first TTI on an associated DL, a number of associated UL channels for HARQ-ACK feedback occur within a third TTI with the first TTI length on the associated UL.

7. The method of claim 6, further comprising:
    detecting with the UE device a first sPDCCH for scheduling at least the DL transmission with the second TTI length.

8. The method of claim 7, further comprising:
    transmitting the HARQ-ACK feedback of the at least the DL transmission, wherein when detecting the first sPDCCH, the HARQ-ACK is transmitted on a first available associated UL channel for HARQ-ACK feedback after N×the second TTI length+k, where N is an integer and where k is a value at least one of specified, configured, or indicated in at least one of the first sPDCCH or in a PDCCH received in the first TTI.

9. The method of claim 8, wherein the transmitting the HARQ-ACK feedback comprises transmitting the HARQ-ACK feedback, wherein for the number of DL transmissions with the second TTI lengths within the first TTI on the associated DL, k induces same association on the third TTI on the associated UL.

10. The method of claim 7, wherein the transmitting the HARQ-ACK feedback comprises transmitting the HARQ-ACK feedback, wherein when detecting the first sPDCCH, the HARQ-ACK is transmitted on the associated UL channel for HARQ-ACK feedback with a first time offset after N×the second TTI length.

11. The method of claim 10, wherein the transmitting the HARQ-ACK feedback comprises transmitting the HARQ-ACK feedback, wherein for the number of DL transmissions with the second TTI lengths within another first TTI on the associated DL, the first time offset induces same association on another third TTI on the associated UL.

12. The method of claim 1, further comprising:
detecting a second sPDCCH for scheduling an UL transmission with a third TTI length different from the first TTI length; and
transmitting at least a scheduled UL transmission on at least an associated UL channel, wherein for a number of sPDCCHs within the first TTI on the associated DL, a plurality of associated UL channels comprising at least the scheduled UL transmission occur within a third TTI on the associated UL.

13. The method of claim 12, further comprising:
monitoring a second sPDCCH region for detecting the second sPDCCH based at least in part on a sTTI/sPDCCH pattern for the first TTI, wherein the sTTI/sPDCCH pattern is determined based at least in part on at least one of a symbol size of a PDCCH region within the first TTI, the CFI value indicated in the first TTI, or a subset of symbols in the first TTI except at least the PDCCH region within the first TTI.

14. The method of claim 13, wherein the second sPDCCH region is the same as the first sPDCCH region.

15. The method of claim 12, wherein the transmitting the at least the scheduled UL transmission on the at least the associated UL channel comprises transmitting the at least the scheduled UL transmission on a first available associated UL channel for scheduled UL transmission after $N'\times TTI_{UL}+k'$, where N' is an integer, $TTI_{UL}$ is the third TTI length or an interval between symbols of the second sPDCCH, and where k' is a value at least one of specified, configured, or indicated in the second sPDCCH.

16. The method of claim 15, wherein the transmitting the at least the scheduled UL transmission on the at least the associated UL channel comprises transmitting the at least the scheduled UL transmission, wherein for the number of sPDCCHs within the first TTI on the associated DL, k' induces same association on the same third TTI on the associated UL channel for the plurality of associated UL channels scheduled with the number of sPDCCHs.

17. The method of claim 12, wherein the transmitting the at least the scheduled UL transmission on the at least the associated UL channel comprises transmitting the at least the scheduled UL transmission on the associated UL channel for scheduled UL transmission with a second time offset of another of a first available associated UL channel for scheduled UL transmission after $N'\times TTI_{UL}$.

18. The method of claim 12, wherein the third TTI comprises a symbol duration of at least one of one symbol, two symbols, three symbols, four symbols, or seven symbols.

19. The method of claim 1, wherein the sTTI/sPDCCH pattern is determined based at least in part on at least one of a symbol size of a PDCCH region within the first TTI, the CFI value indicated in the first TTI, or a subset of symbols in the first TTI except at least the PDCCH region within the first TTI.

20. The method of claim 1, further comprising:
monitoring a second sPDCCH region for detecting a second sPDCCH based at least in part on at least one sTTI/sPDCCH pattern for the first TTI.

21. The method of claim 20,
wherein the sTTI/sPDCCH pattern is determined based at least in part on at least one of a symbol size of a PDCCH region within the first TTI, the CFI value indicated in the first TTI, or a subset of symbols in the first TTI except at least the PDCCH region within the first TTI.

* * * * *